US012613572B2

(12) United States Patent
Burns et al.

(10) Patent No.: US 12,613,572 B2
(45) Date of Patent: Apr. 28, 2026

(54) CONTROLLING REPRESENTATIONS OF VIRTUAL OBJECTS IN A COMPUTER-GENERATED REALITY ENVIRONMENT

(71) Applicant: Apple Inc., Cupertino, CA (US)

(72) Inventors: Aaron M. Burns, Keyworth (GB); Nathan Gitter, Cupertino, CA (US); Alexis H. Palangie, Palo Alto, CA (US); Pol Pla I. Consesa, San Francisco, CA (US); David M. Schattel, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/047,546

(22) Filed: Feb. 6, 2025

(65) Prior Publication Data

US 2025/0181144 A1 Jun. 5, 2025

Related U.S. Application Data

(63) Continuation of application No. 18/397,823, filed on Dec. 27, 2023, now Pat. No. 12,254,127, which is a continuation of application No. 17/396,441, filed on Aug. 6, 2021, now Pat. No. 11,861,056, which is a continuation of application No. PCT/US2020/048833, filed on Aug. 31, 2020.

(60) Provisional application No. 63/058,217, filed on Jul. 29, 2020, provisional application No. 62/907,216, filed on Sep. 27, 2019.

(51) Int. Cl.
*G06F 3/01* (2006.01)
*G06F 3/04842* (2022.01)

*G06T 7/70* (2017.01)
*G06T 19/00* (2011.01)

(52) U.S. Cl.
CPC .......... *G06F 3/011* (2013.01); *G06F 3/04842* (2013.01); *G06T 7/70* (2017.01); *G06T 19/006* (2013.01)

(58) Field of Classification Search
CPC .......... G06F 1/163; G06F 3/011; G06F 3/013; G06F 3/017; G06F 3/0481; G06F 3/04815; G06F 3/0484; G06F 3/04842; G06F 3/0488; G06F 3/14; G06T 19/003; G06T 19/006; G06T 7/70
See application file for complete search history.

(56) References Cited

U.S. PATENT DOCUMENTS

| | | | |
|---|---|---|---|
| 6,335,765 B1 | 1/2002 | Daly et al. | |
| 6,567,085 B1 | 5/2003 | Edmark | |
| 10,559,133 B2 * | 2/2020 | Knoppert | ................ G06T 19/20 |

(Continued)

OTHER PUBLICATIONS

Notice of Allowance received for Korean Patent Application No. 10-2021-7032913, mailed on Apr. 22, 2024, 7 pages (2 pages of English Translation and 5 pages of Official Copy).

(Continued)

*Primary Examiner* — Nelson M Rosario
(74) *Attorney, Agent, or Firm* — YHE Law LLP

(57) ABSTRACT

In accordance with some embodiments, an exemplary process for controlling representations of virtual objects based on respective user contexts that each correspond to different respective locations in a computer-generated reality (CGR) environment is described.

24 Claims, 29 Drawing Sheets

(56)　　　　　References Cited

U.S. PATENT DOCUMENTS

| | | | |
|---|---|---|---|
| 2013/0234934 A1* | 9/2013 | Champion | G06F 3/0346 |
| | | | 345/156 |
| 2015/0382131 A1 | 12/2015 | Kuehne et al. | |
| 2017/0332187 A1 | 11/2017 | Lin et al. | |
| 2018/0144541 A1* | 5/2018 | Champion | H04N 13/106 |
| 2019/0313083 A1* | 10/2019 | Chavez | G06F 3/011 |
| 2020/0368623 A1 | 11/2020 | Wu et al. | |

OTHER PUBLICATIONS

Office Action received for Chinese Patent Application No. 202080027747.X, mailed on Sep. 11, 2024, 11 pages (5 pages of English Translation and 6 pages of Official Copy).
Office Action received for European Patent Application No. 20772478. 2, mailed on Apr. 30, 2025, 9 pages.

\* cited by examiner

System
100
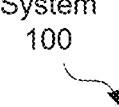
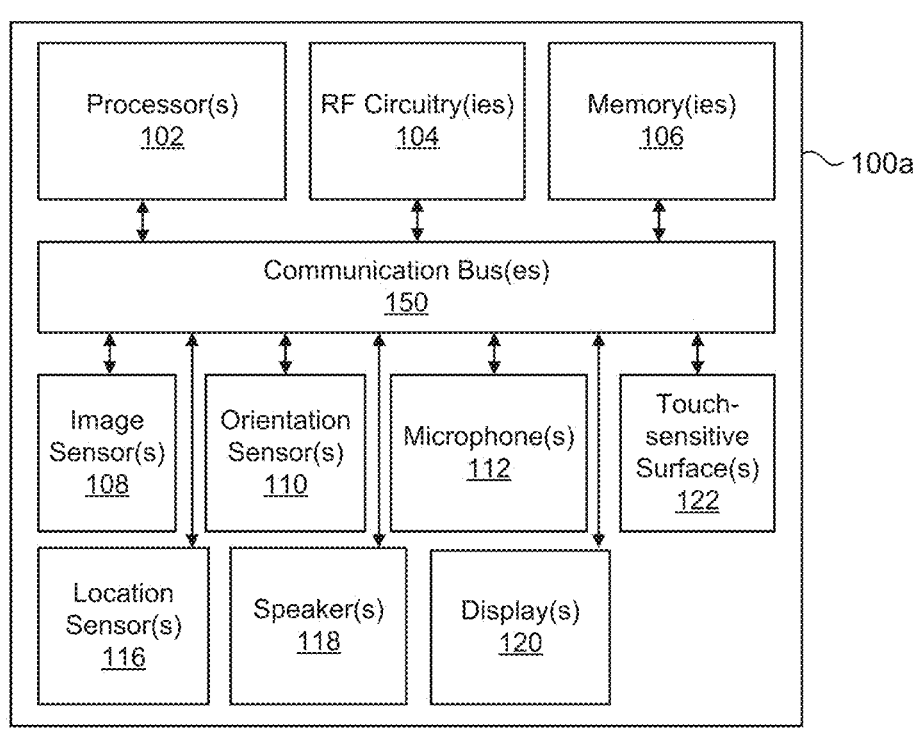
FIG. 1A

500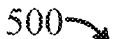

---

502
Display, via a display of an electronic device, a first representation of a virtual object at a first location within a computer-generated reality (CGR) environment, wherein the first location corresponds to a first use context of a plurality of use contexts

---

504
Receive a request to move the first representation, within the CGR environment, to a second location that is different from the first location

---

In response to receiving the request:

506
In accordance with a determination that the second location corresponds to a second use context of the plurality of use contexts, display, via the display of the electronic device, at the second location, a second representation of the virtual object based on the second use context, where the second representation is different from the first representation

508
In accordance with a determination that the second location corresponds to a third use context of the plurality of use contexts, display, via the display of the electronic device, at the second location, a third representation of the virtual object based on the third use context, where the third representation is different from the first representation and the second representation

700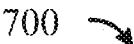

<u>702</u>
Display, via a display of a wearable electronic device, a two-dimensional (2D) representation of a virtual object at a first location of a computer-generated reality (CGR) environment <u>704</u>
Receive a request to concurrently display a three-dimensional (3D) representation of the virtual object with the 2D representation <u>706</u>
In response to the request, concurrently display, via the display of the wearable electronic device, the 2D representation at the first location and the 3D representation at a second location of the CGR environment, where the second location is different from the first location

FIG. 7

1300

---

1302

Display, via a display of a wearable electronic device, a first representation of a virtual object within a computer-generated reality (CGR) environment

---

In response to a detected movement of an input mechanism:

1304

In accordance with a determination that a current location of the input mechanism is within a predetermined distance from the first representation of the virtual object, display, via the display of the wearable electronic device, a second representation of the virtual object within the CGR environment, wherein the second representation is different from the first representation

1306

In accordance with a determination that the current location of the input mechanism is not within the predetermined distance from the first representation of the virtual object, maintain display of the first representation without displaying the second representation

CONTROLLING REPRESENTATIONS OF VIRTUAL OBJECTS IN A COMPUTER-GENERATED REALITY ENVIRONMENT

CROSS-REFERENCE TO RELATED APPLICATIONS

This application is a continuation of U.S. patent application Ser. No. 18/397,823, now U.S. Pat. No. 12,254,127, entitled "CONTROLLING REPRESENTATIONS OF VIR-TUAL OBJECTS IN A COMPUTER-GENERATED REALITY ENVIRONMENT," filed Dec. 27, 2023, which is a continuation of U.S. patent application Ser. No. 17/396,441, now U.S. Pat. No. 11,861,056, entitled "CONTROL-LING REPRESENTATIONS OF VIRTUAL OBJECTS IN A COMPUTER-GENERATED REALITY ENVIRON-MENT," filed Aug. 6, 2021, which is a continuation of PCT/US2020/048833, entitled "CONTROLLING REPRE-SENTATIONS OF VIRTUAL OBJECTS IN A COM-PUTER-GENERATED REALITY ENVIRONMENT," filed Aug. 31, 2020, which claims priority to U.S. Provisional Patent Application Ser. No. 63/058,217, entitled "CON-TROLLING REPRESENTATIONS OF VIRTUAL OBJECTS IN A COMPUTER-GENERATED REALITY ENVIRONMENT," filed on Jul. 29, 2020; and U.S. Provi-sional Patent Application Ser. No. 62/907,216, entitled "CONTROLLING REPRESENTATIONS OF VIRTUAL OBJECTS BASED ON USE CONTEXTS OF LOCA-TIONS IN A COMPUTER-GENERATED REALITY ENVIRONMENT," filed on Sep. 27, 2019. The contents of the aforementioned applications are hereby incorporated by reference in their entireties.

FIELD

The present disclosure relates generally to computer-generated reality environments, and more specifically to controlling representations of virtual objects in a computer-generated reality environment.

BACKGROUND

Computer-generated reality (CGR) environments are environments where at least some objects displayed for a user's viewing are generated by a computer. In some uses, a user may interact with virtual objects. The user may move the virtual objects to different locations within the computer-generated reality environment. However, there is a lack of robust functionality for controlling how the virtual objects are represented at the different locations within the com-puter-generated reality environments. In addition, there is a lack of functionality for controlling representations of vir-tual objects in the computer-generated environments based on characteristics of an input mechanism that may be used by the users to interact with the virtual objects.

Furthermore, the virtual objects may be represented as two-dimensional objects and/or three-dimensional objects within the computer-generated reality environments. How-ever, there is a lack of robust functionality for controlling the concurrent display of the representations of the virtual objects.

BRIEF SUMMARY

In accordance with some embodiments, a method com-prises: displaying, via a display of an electronic device, a first representation of a virtual object at a first location within a CGR environment, wherein in the first location corresponds to a first use context of a plurality of use contexts; receiving a request to move the first representation, within the CGR environment, to a second location that is different from the first location; and in response to receiving the request: in accordance with a determination that the second location corresponds to a second use context of the plurality of use contexts, displaying, via the display of the electronic device, at the second location, a second represen-tation of the virtual object based on the second use context, wherein the second representation is different from the first representation; and in accordance with a determination that the second location corresponds to a third use context of the plurality of use contexts, displaying, via the display of the electronic device, at the second location, a third represen-tation of the virtual object based on the third use context, wherein the third representation is different from the first representation and the second representation.

In accordance with some embodiments, a system includes: a display; one or more processors; and memory storing one or more programs configured to be executed by the one or more processors. The one or more programs includes instructions for: displaying, via the display, a first representation of a virtual object at a first location within a CGR environment, wherein the first location corresponds to a first use context of a plurality of use contexts; receiving a request to move the first representation, within the CGR environment, to a second location that is different from the first location; and in response to receiving the request: in accordance with a determination that the second location corresponds to a second use context of the plurality of use contexts, displaying, via the display, at the second location, a second representation of the virtual object based on the second use context, wherein the second representation is different from the first representation; and in accordance with a determination that the second location corresponds to a third use context of the plurality of use contexts, display-ing, via the display, at the second location, a third represen-tation of the virtual object based on the third use context, wherein the third representation is different from the first representation and the second representation.

In accordance with some embodiments, a non-transitory computer-readable storage medium stores one or more pro-grams configured to be executed by one or more processors of a system having a display, the one or more programs including instructions for: displaying, via the display, a first representation of a virtual object at a first location within a CGR environment, wherein the first location corresponds to a first use context of a plurality of use contexts; receiving a request to move the first representation, within the CGR environment, to a second location that is different from the first location; and in response to receiving the request: in accordance with a determination that the second location corresponds to a second use context of the plurality of use contexts, displaying, via the display, at the second location, a second representation of the virtual object based on the second use context, wherein the second representation is different from the first representation; and in accordance with a determination that the second location corresponds to a third use context of the plurality of use contexts, display-ing, via the display, at the second location, a third represen-tation of the virtual object based on the third use context, wherein the third representation is different from the first representation and the second representation.

In accordance with some embodiments, a transitory com-puter-readable storage medium stores one or more programs configured to be executed by one or more processors of a system having a display, the one or more programs including instructions for: displaying, via the display, a first representation of a virtual object at a first location within a CGR environment, wherein the first location corresponds to a first use context of a plurality of use contexts; receiving a request to move the first representation, within the CGR environment, to a second location that is different from the first location; and in response to receiving the request: in accordance with a determination that the second location corresponds to a second use context of the plurality of use contexts, displaying, via the display, at the second location, a second representation of the virtual object based on the second use context, wherein the second representation is different from the first representation; and in accordance with a determination that the second location corresponds to a third use context of the plurality of use contexts, displaying, via the display, at the second location, a third representation of the virtual object based on the third use context, wherein the third representation is different from the first representation and the second representation.

In accordance with some embodiments, a system includes: a display; means for displaying, via the display, a first representation of a virtual object at a first location within a CGR environment, wherein the first location corresponds to a first use context of a plurality of use contexts; means for receiving a request to move the first representation, within the CGR environment, to a second location that is different from the first location; and means, responsive to receiving the request, for: in accordance with a determination that the second location corresponds to a second use context of the plurality of use contexts, displaying, via the display, at the second location, a second representation of the virtual object based on the second use context, wherein the second representation is different from the first representation; and in accordance with a determination that the second location corresponds to a third use context of the plurality of use contexts, displaying, via the display, at the second location, a third representation of the virtual object based on the third use context, wherein the third representation is different from the first representation and the second representation.

In accordance with some embodiments, a method comprises: displaying, via a display of an electronic device, a two-dimensional (2D) representation of a virtual object at a first location of a CGR environment; receiving a request to concurrently display a three-dimensional (3D) representation of the virtual object with the 2D representation; and in response to the request, concurrently displaying, via the display of the wearable electronic device, the 2D representation at the first location and the 3D representation at a second location of the CGR environment, wherein the second location is different from the first location.

In accordance with some embodiments, a system includes: a display; one or more processors; and memory storing one or more programs configured to be executed by the one or more processors. The one or more programs includes instructions for: displaying, via the display, a 2D representation of a virtual object at a first location of a CGR environment; receiving a request to concurrently display a 3D representation of the virtual object with the 2D representation; and in response to the request, concurrently displaying, via the display, the 2D representation at the first location and the 3D representation at a second location of the CGR environment, wherein the second location is different from the first location.

In accordance with some embodiments, a non-transitory computer-readable storage medium stores one or more programs configured to be executed by one or more processors of a system having a display, the one or more programs including instructions for: displaying, via the display, a 2D representation of a virtual object at a first location of a CGR environment; receiving a request to concurrently display a 3D representation of the virtual object with the 2D representation; and in response to the request, concurrently displaying, via the display, the 2D representation at the first location and the 3D representation at a second location of the CGR environment, wherein the second location is different from the first location.

In accordance with some embodiments, a transitory computer-readable storage medium stores one or more programs configured to be executed by one or more processors of a system having a display, the one or more programs including instructions for: displaying, via the display, a 2D representation of a virtual object at a first location of a CGR environment; receiving a request to concurrently display a 3D representation of the virtual object with the 2D representation; and in response to the request, concurrently displaying, via the display, the 2D representation at the first location and the 3D representation at a second location of the CGR environment, wherein the second location is different from the first location.

In accordance with some embodiments, a system includes: a display; means for displaying, via the display, a 2D representation of a virtual object at a first location of a CGR environment; means for receiving a request to concurrently display a 3D representation of the virtual object with the 2D representation; and in response to the request, means for concurrently displaying, via the display, the 2D representation at the first location and the 3D representation at a second location of the CGR environment, wherein the second location is different from the first location.

In accordance with some embodiments, a method comprises: displaying, via a display of a wearable electronic device, a first representation of a virtual object within a CGR environment; and in response to a detected movement of an input mechanism: in accordance with a determination that a current location of the input mechanism is within a predetermined distance from the first representation of the virtual object, displaying, via the display of the wearable electronic device, a second representation of the virtual object within the CGR environment, wherein the second representation is different from the first representation; and in accordance with a determination that the current location of the input mechanism is not within the predetermined distance from the first representation of the virtual object, maintaining display of the first representation without displaying the second representation.

In accordance with some embodiments, a system includes: a display; one or more processors; and memory storing one or more programs configured to be executed by the one or more processors. The one or more programs includes instructions for: displaying, via the display, a first representation of a virtual object within a CGR environment; and in response to a detected movement of an input mechanism: in accordance with a determination that a current location of the input mechanism is within a predetermined distance from the first representation of the virtual object, displaying, via the display, a second representation of the virtual object within the CGR environment, wherein the second representation is different from the first representation; and in accordance with a determination that the current location of the input mechanism is not within the predetermined distance from the first representation of the virtual object, maintaining display of the first representation without displaying the second representation.

In accordance with some embodiments, a non-transitory computer-readable storage medium stores one or more programs configured to be executed by one or more processors of a system having a display, the one or more programs including instructions for: displaying, via the display, a first representation of a virtual object within a CGR environment; and in response to a detected movement of an input mechanism: in accordance with a determination that a current location of the input mechanism is within a predetermined distance from the first representation of the virtual object, displaying, via the display, a second representation of the virtual object within the CGR environment, wherein the second representation is different from the first representation; and in accordance with a determination that the current location of the input mechanism is not within the predetermined distance from the first representation of the virtual object, maintaining display of the first representation without displaying the second representation.

In accordance with some embodiments, a transitory computer-readable storage medium stores one or more programs configured to be executed by one or more processors of a system having a display, the one or more programs including instructions for: displaying, via the display, a first representation of a virtual object within a CGR environment; and in response to a detected movement of an input mechanism: in accordance with a determination that a current location of the input mechanism is within a predetermined distance from the first representation of the virtual object, displaying, via the display, a second representation of the virtual object within the CGR environment, wherein the second representation is different from the first representation; and in accordance with a determination that the current location of the input mechanism is not within the predetermined distance from the first representation of the virtual object, maintaining display of the first representation without displaying the second representation.

In accordance with some embodiments, a system includes: a display; means for displaying, via the display, a first representation of a virtual object within a CGR environment; and in response to a detected movement of an input mechanism: means for, in accordance with a determination that a current location of the input mechanism is within a predetermined distance from the first representation of the virtual object, displaying, via the display, a second representation of the virtual object within the CGR environment, wherein the second representation is different from the first representation; and means for, in accordance with a determination that the current location of the input mechanism is not within the predetermined distance from the first representation of the virtual object, maintaining display of the first representation without displaying the second representation.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

BRIEF DESCRIPTION OF THE FIGURES

In the following description, reference is made to the accompanying figures which form a part thereof, and which illustrate several examples of the present disclosure. It is understood that other examples may be utilized and structural and operational changes may be made without departing from the scope of the present disclosure. The use of the same reference symbols in different figures indicates similar or identical items.

FIGS. 1A-1B depict exemplary systems for use in various computer-generated reality technologies.

FIG. 5 is a flow diagram illustrating a method executed to implement aspects of the present disclosure.

FIG. 7 is a flow diagram illustrating a method executed to implement aspects of the present disclosure.

FIG. 13 is a flow diagram illustrating a method executed to implement aspects of the present disclosure.

DESCRIPTION

Figure 1B:
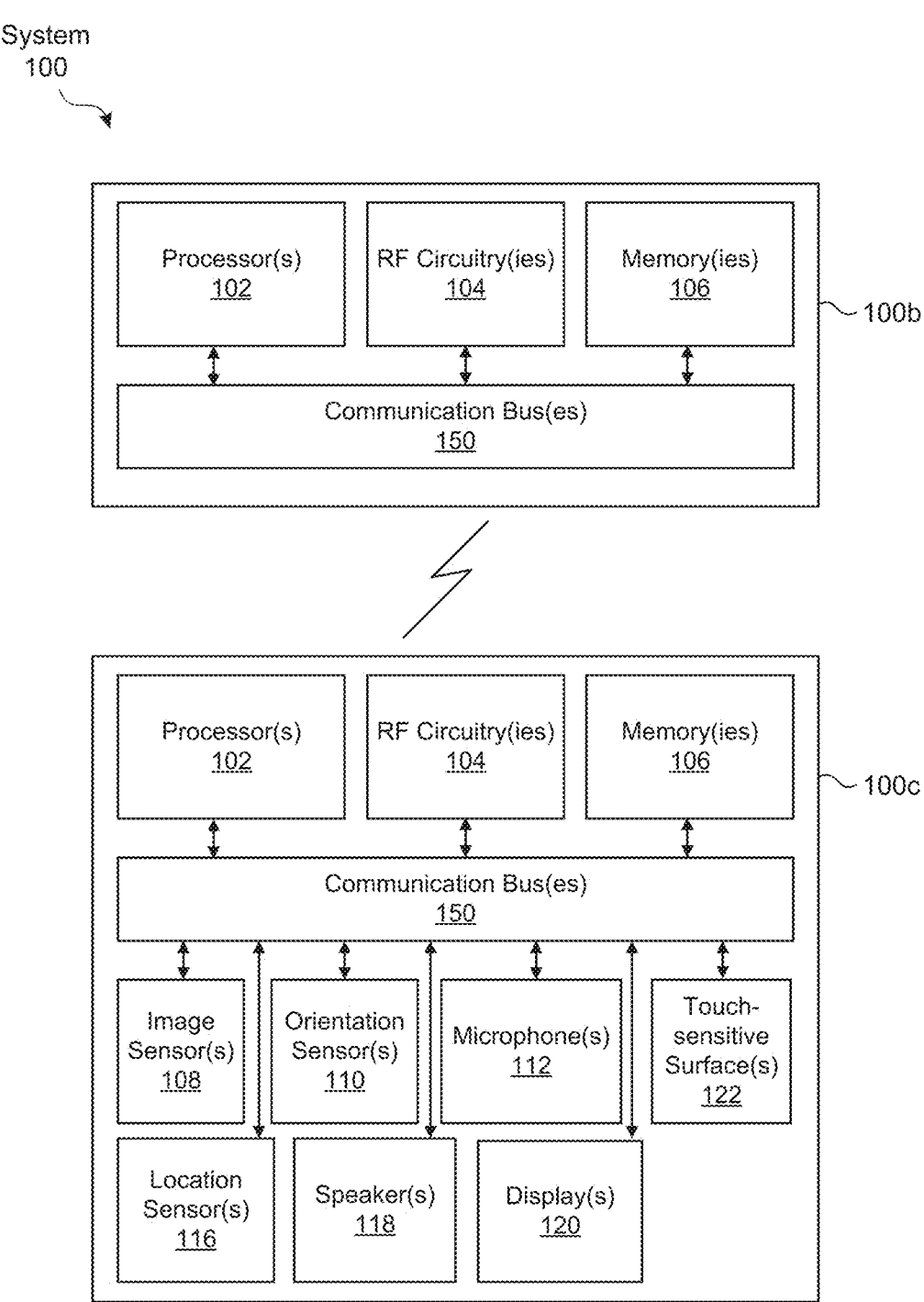

Various examples of electronic systems and techniques for using such systems in relation to various CGR technologies are described.

A physical environment (or real environment) refers to a physical world that people can sense and/or interact with without aid of electronic systems. Physical environments, such as a physical park, include physical articles (or physical objects or real objects), such as physical trees, physical buildings, and physical people. People can directly sense and/or interact with the physical environment, such as through sight, touch, hearing, taste, and smell.

In contrast, a CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create a three-dimensional (3D) or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment (or virtual environment) refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, an MR environment is anywhere between, but not including, a wholly physical environment at one end and a VR environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of MR include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An AR environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one example, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1A and FIG. 1B depict exemplary system 100 for use in various CGR technologies.

In some examples, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some examples, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some examples, device 100a is implemented in a base station device or a HMD device.

As illustrated in FIG. 1B, in some examples, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a HMD) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

In some examples, system 100 is a mobile device. In some examples, system 100 is an HMD device. In some examples, system 100 is a wearable HUD device.

System 100 includes processor(s) 102 and memory(ies) 106. Processor(s) 102 include one or more general processors, one or more graphics processors, and/or one or more digital signal processors. In some examples, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some examples, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some examples, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some examples, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical objects in the real environment from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some examples, system 100 includes microphones(s) 112. System 100 uses microphone(s) 112 to detect sound from the user and/or the real environment of the user. In some examples, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

Various aspects of the present disclosure are directed to systems and techniques that provide functionality for controlling representations of virtual objects within a CGR environment.

In particular, aspects of the present disclosure are directed to systems and techniques that provide functionality for controlling a representation of a virtual object based on a use context associated with a location of the virtual object within the CGR environment. The systems and techniques described herein allow for a representation of a virtual object to be adapted to the particular use context associated with the location within the CGR environment.

Figure 2A:
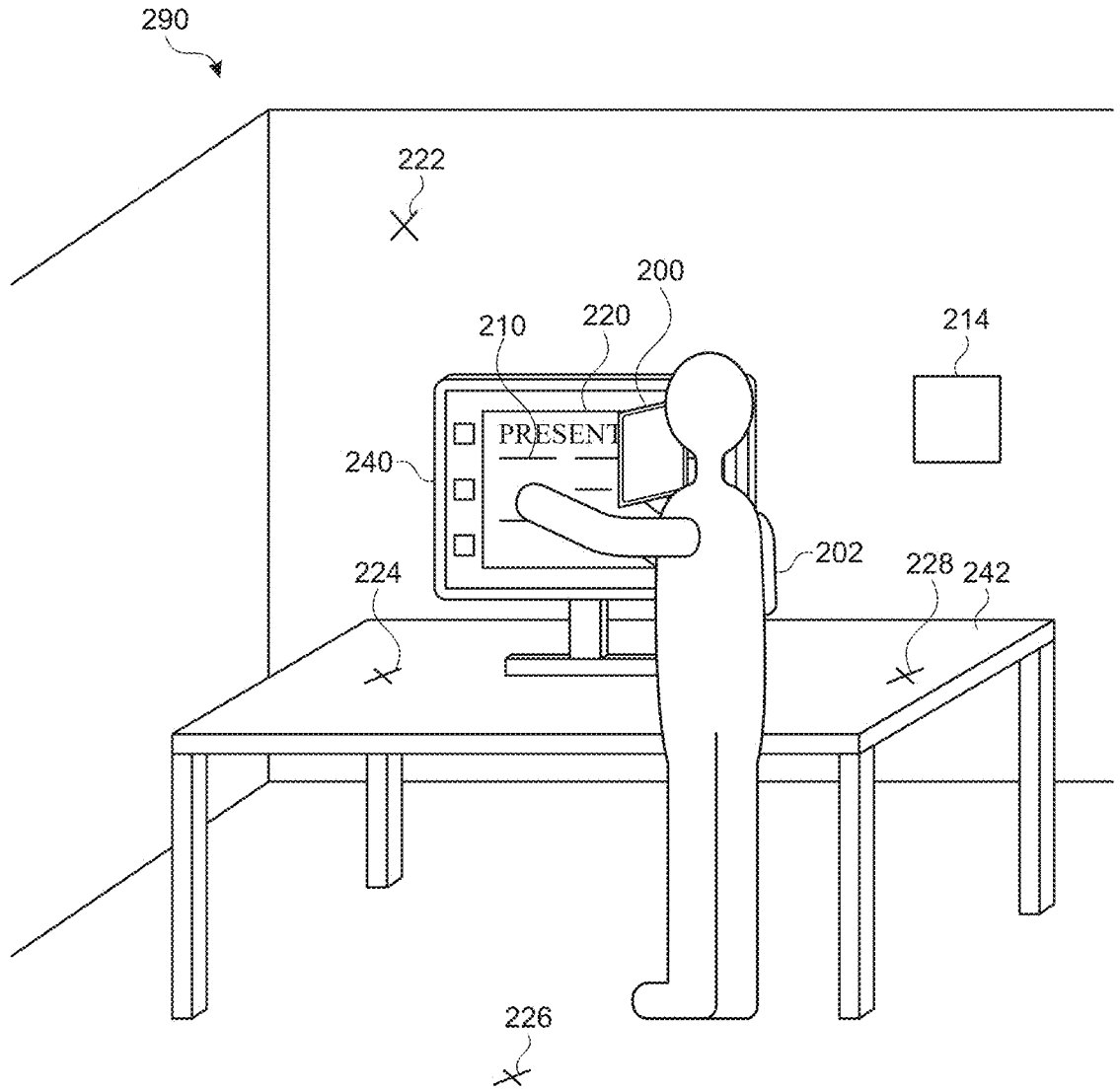
FIGS. 2A-2E depict exemplary techniques for controlling a representation of a virtual object based on use contexts at different locations within a CGR environment in accordance with aspects of the present disclosure.

FIGS. 2A-2E illustrate exemplary techniques for controlling a representation of a virtual object of a CGR environment based on a use context associated with a location of the virtual object within the CGR environment in accordance with aspects of the present disclosure. In particular, FIG. 2A illustrates user 202 and electronic device 200. In some embodiments, electronic device 200 may be a wearable electronic device (e.g., an HMD). Examples of a wearable electronic device are described herein, such as with respect to electronic device 100a described above with reference to FIGS. 1A and 1B.

As shown in FIG. 2A, user 202 wears electronic device 200, which is configured to enable user 202 to perceive CGR environment 290. As described above, CGR environment 290 may include physical objects, or representations thereof, and virtual objects, with virtual objects superimposed upon the physical objects (e.g., in AR implementations), or physical objects superimposed upon the virtual objects (e.g., in AV implementations) to present a coherent CGR environment to user 202. In some embodiments, CGR environment 290 may be a wholly virtual environment (e.g., in VR implementations), in which every object within CGR environment 290 is a virtual object. Whether entirely or partially virtual implementations, in the example illustrated in FIG. 2A, virtual object 210 may be a representation of a presentation application (e.g., an application configured to facilitate multimedia presentations) and may be presented to user 202 within CGR environment 290.

In embodiments, virtual object 210 may be located at any location within CGR environment 290. In the particular example illustrated in FIGS. 2A-2E, CGR environment 290 may include at least location 220, 222, 224, 226, and 228. As will be appreciated, these locations are described for illustration purposes and not intended to be limiting in any way. That is, any other location within CGR environment 290 may be applicable to the features and functionalities described herein.

In aspects, location 220 may correspond to a location on a representation of an electronic device within CGR environment 290. For example, location 220 may correspond to a location (e.g., a display, a screen, a surface or case of an electronic device) on display 240. Display 240 may be, for example, a display of a computer, laptop, tablet, phone, display, projector display, etc. Display 240 may be an actual physical device (e.g., a physical object) or may be a virtual representation of a display (e.g., a virtual object) within CGR environment 290.

Location 222 may correspond to a location on a vertical plane of CGR environment 290 (e.g., a predominantly vertical plane such as a structure that is a vertical plane, a wall, a structure that corresponds to a wall-like structure such as a side of building, bedroom wall, fence, a vertical or auxiliary vertical plane, etc.). In the particular example illustrated in FIG. 2A, location 222 corresponds to a location on a wall of CGR environment 290.

Location 224, and/or location 228, may correspond to a location on a horizontal plane of CGR environment 290 (e.g., a predominantly horizontal plane such as a structure that is a horizontal plane, a desktop, table, countertop, shelf, floor, an elevated horizontal plane such as a horizontal plane that is above another horizontal plane within the CGR environment, a horizontal plane that is not elevated, etc.). In the particular example illustrated in FIG. 2A, locations 224 and 228 correspond to locations on desktop 242, which may be a physical or virtual object.

Location 226 may correspond to a location on a horizontal plane of CGR environment 290, but of a different type than locations 224 and/or 228. For example, location 226 may be a location on a predominantly horizontal plane such as a structure that is a horizontal plane, a floor, a sidewalk, grass, lawn, a surface that one or more people are standing on, a non-elevated horizontal plane such as a horizontal plane that is below another horizontal plane within the CGR, etc. In the particular example illustrated in FIG. 2A, location 226 corresponds to a locations on the floor of CGR environment 290.

As shown in FIG. 2A, virtual object 210 may be displayed at location 220 (e.g., by electronic device 200). In some embodiments, a location within CGR environment 290 (e.g., location 220) may be associated with or otherwise correspond to at least one use context of a plurality of use contexts. In embodiments, a use context may be related to a type of surface (e.g., a desk, a wall, a computer screen, a floor, etc.) or the type of material of the surface (e.g., sand, grass, concrete, carpet, etc.) that the virtual object will be placed on, and/or may be related to a manner in which the virtual object will be used (e.g., manipulated, interacted with) or displayed (e.g., presented) in the CGR environment.

In aspects, location 220 may be associated with a first use context. For example, as described above, location 220 may be a location on display 240. Display 240 may be a representation of an electronic device. In this case, the first use context associated with location 220 may be the type of surface or object of location 220, which is an electronic device. Thus, in this case, the first use context may be satisfied when a determination is made that location 220 is a location on a representation of an electronic device. In other embodiments, the first use context associated with location 220 may be the manner in which virtual object 210 will be used when in location 220. For example, it may be determined that, at location 220, which is an electronic device, virtual object 210 will be used as an application for multimedia presentations on display 240. In this case, it may be determined that virtual object is to be represented as a two-dimensional (2D) window based on the manner in which virtual object will be used.

It is noted that, as used herein, a representation of a virtual object may include the content, size, functionality, user interface objects, form, shape, design, graphical presentation of the virtual object within the CGR environment, etc. For example, a virtual object may be represented as a 2D object (e.g., an application icon, an application window, an image, a user interface of an application, etc.). In other examples, the virtual object may be represented as a 3D object within the CGR environment. In some embodiments, a first representation of a virtual object may be a 3D object including particular content, and a second, different representation of the virtual object may be a 3D object including different content from the particular content in the first representation.

In some embodiments, a representation of a virtual object within the CGR environment may include audio characteristics. For example, one representation may include particular sounds, noises, spoken words, etc., and a second representation may include different sounds, noises, spoken words, etc. In some cases, the representation of a virtual object may also include the level of sound, in which one representation of a virtual object may include one level of sound, and a different representation may include a higher or lower level of sound.

In accordance with the above, when virtual object 210 is located, at least partially on location 220, whether by being moved or dragged to location 220 or by being displayed on location 220, virtual object 210 is displayed as a 2D window on display 240, (e.g., by electronic device 200) based on a determination that location 220 is associated with a use context that is satisfied by a determination that location 220 is on display 240, display 240 being an electronic device.

In some embodiments, virtual object 210 may be configured such that user 202 may interact with virtual object 210. Interaction with virtual object 210 may be via input sensors, as described above, configured to detect a user input to interact with virtual objects of CGR environment 290. In some embodiments, the input sensors may include a mouse, a stylus, touch-sensitive surfaces, image-sensors (e.g., to perform hand-tracking), etc., which may be configured to allow user 202 to grab, move, drag, click, select and/or otherwise select virtual object 210. As such, in embodiments, a request to move virtual object 210 to a location within CGR environment 290 may be received.

In the example shown in FIG. 2A, a request to move virtual object 210 from location 220 to another location within CGR environment 290 may include user 202 grabbing or otherwise selecting virtual object 210 for moving from location 220, and may cause virtual object 210 to depart location 220. In some embodiments, as soon as virtual object 210 is removed from a location (e.g., location 220), the current representation of virtual object 210 may change. For example, as soon as virtual object 210 is removed from location 220, the current representation of virtual object 210 as a 2D window of a multimedia presentation application may be changed to another representation. In some implementations, the current representation of virtual object 210 may be changed to some transitional representation, which may not be associated with a particular use context, but rather may be a default representation indicating that virtual object 210 is transitioning from one location to another. In other implementations, the current representation of virtual object 210 may not be changed when virtual object 210 is removed from a location but, instead, the current representation of virtual object 210 may remain unchanged until the virtual object is positioned in another location which is determined to be associated with a use context for which a different representation of virtual object 210 may be determined to be displayed. In this case, the current representation of virtual object 210 may be maintained during transit of virtual object 210 from the current location to the new location.

Figure 2B:
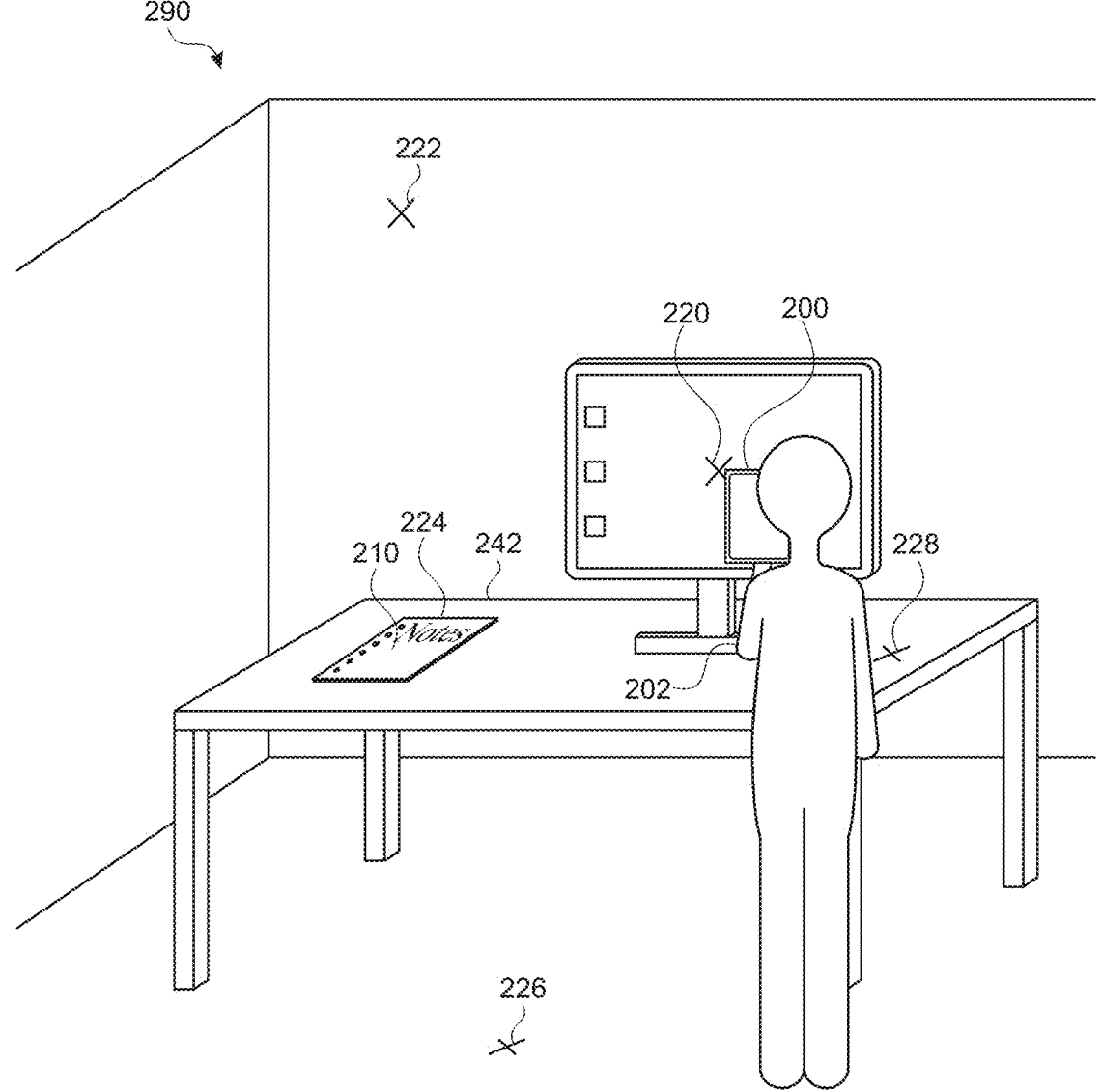

FIG. 2B shows an example of virtual object 210 displayed (e.g., by electronic device 200) on location 224. In this example, in response to the request to move the virtual object to location 224, at least one use context corresponding to location 224 may be determined. For example, location 224 may correspond to a location on desktop 242. In this case, it may be determined that location 224 is associated with a use context that is satisfied by the type of location of location 224 (e.g., the type of surface, the air), location 224 being a location on desktop 242 (e.g., a location on a horizontal plane). In alternative or additional embodiments, location 224 on desktop 242 may be determined to be a location in which virtual object 210 may be used, e.g., by user 202, to make notes regarding a multimedia presentation. In either case, whether because location 224 is a location on a desktop or because location 224 is a location in which the virtual object may be used to make annotations to a multimedia presentation, virtual object 210 may be represented as a 3D object (e.g., a notepad, notebook, book, or any other 3D representation) configured to facilitate a user annotating and/or making notes on the multimedia presentation.

Although not illustrated, virtual object 210 may be moved from location 224 on desktop 242 to location 228 also on desktop 242. In embodiments, the representation (e.g., the 3D virtual notepad) of virtual object 210 may remain the same on location 228 as in location 224, as both locations may be associated with the same use context. Alternatively, although both locations 224 and 228 are on desktop 242 (e.g., the same type of surface), the representation of the virtual object when on location 228 may be different than the representation when on location 224. For example, the representation of virtual object when on location 228 may be of a different size (e.g., smaller or larger) or may be differently oriented, than the representation when on location 224 because location 228 may be determined to not be able to accommodate the size and/or orientation of the representation of virtual object 210 when on location 224. In some embodiments, different locations within the same type of surface (e.g., different locations on desktop 242, on location 222, etc.) may be configured for different use contexts. For example, a particular location on desktop 242 may be configured with a use context in which the representation of virtual object 210 may be on a particular language, and another location on desktop 242 may be configured with a use context in which the representation of virtual object 210 may be on a different language.

Figure 2C:
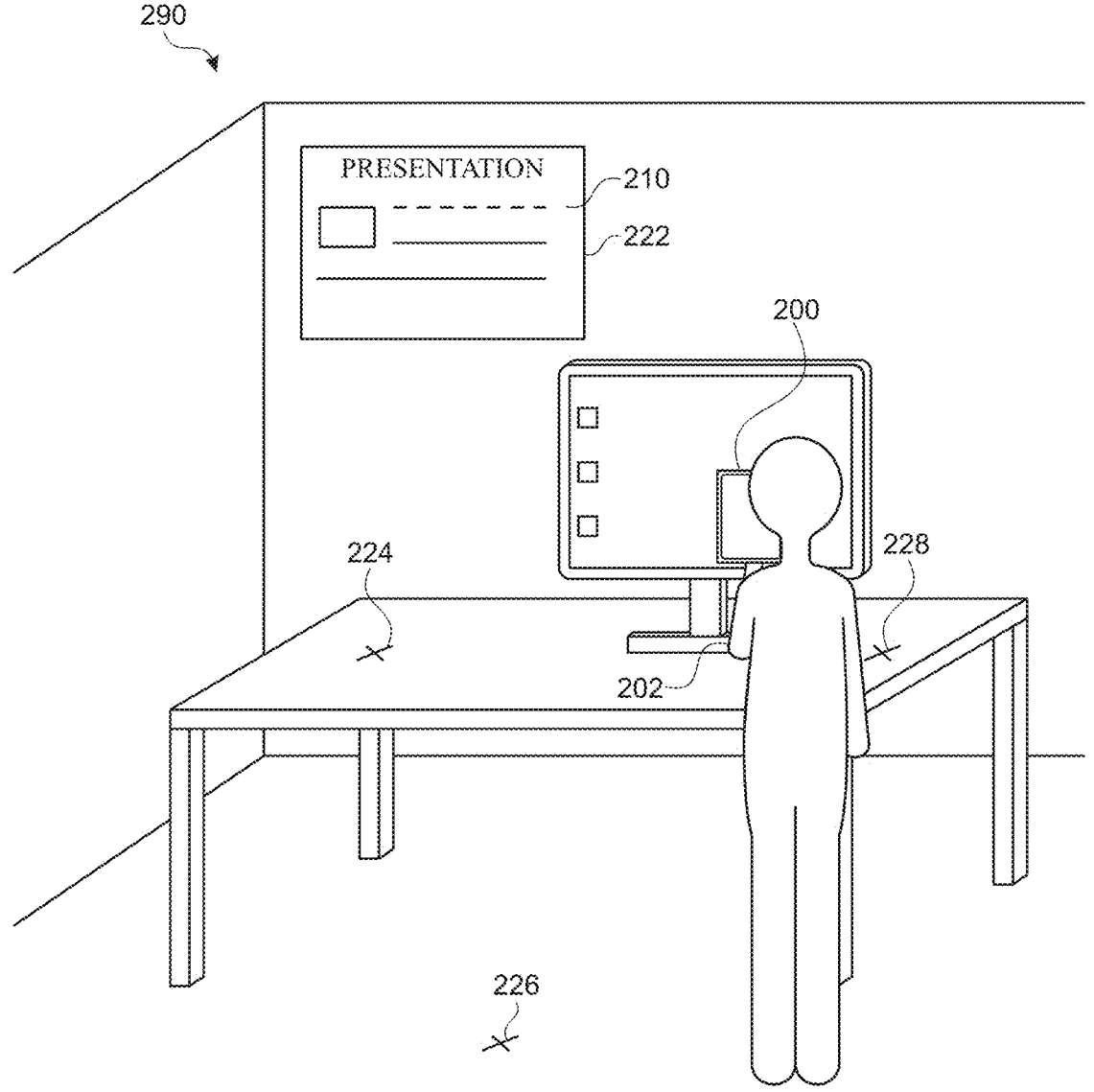

FIG. 2C shows an example of virtual object 210 displayed on location 222. For example, a request to move virtual object 210 to location 222 may be received. The request may include a request to move virtual object 210 from any other location within CGR environment 290 (e.g., location 220, location 224, location 226, etc.). In response to the request, virtual object 210 may be moved to location 222, and a representation of virtual object 210 to be displayed at location 222 may be determined. In this example, in response to the request to move the virtual object to location 222, at least one use context corresponding to location 222 may be determined. For example, location 222 may correspond to a location on a vertical plane (e.g., a wall) of CGR environment 290. In this case, it may be determined that location 222 is associated with a use context that is satisfied by the type of location of location 222 (e.g., the type of surface), location 222 being a location on a wall of CGR environment 290. In alternative or additional embodiments, location 222 on a wall of CGR environment 290 may be determined to be a location in which virtual object 210 may be used to present a multimedia presentation. In either case, whether because location 222 is a location on a wall or because location 222 is a location in which the virtual object may be used to present the multimedia presentation, virtual object 210 may be represented (e.g., displayed by electronic device 200) as a large window object configured to facilitate presenting the multimedia presentation. For example, the large window object may be a 2D window, or a 3D representation of a large monitor, displayed as fixed against the wall. In some embodiments, the size of the large window object against the wall may be determined based on the distance of the wall against which the large window object is displayed relative to the location of user 202 within CGR environment 290.

In some embodiments, the content (e.g., the information and/or arrangement of information) of the representation of virtual object 210 on location 222 may be different than the content in the representations of virtual object 210 at other locations. For example, while at location 224, the 3D notepad used as the representation of virtual object 210 may include information arranged in a specific arrangement within the 3D notepad. While at location 222, the large window display against the wall used as the representation of virtual object 210 may include different information, which may be arranged in a different arrangement, within the large window display.

Figure 2D:
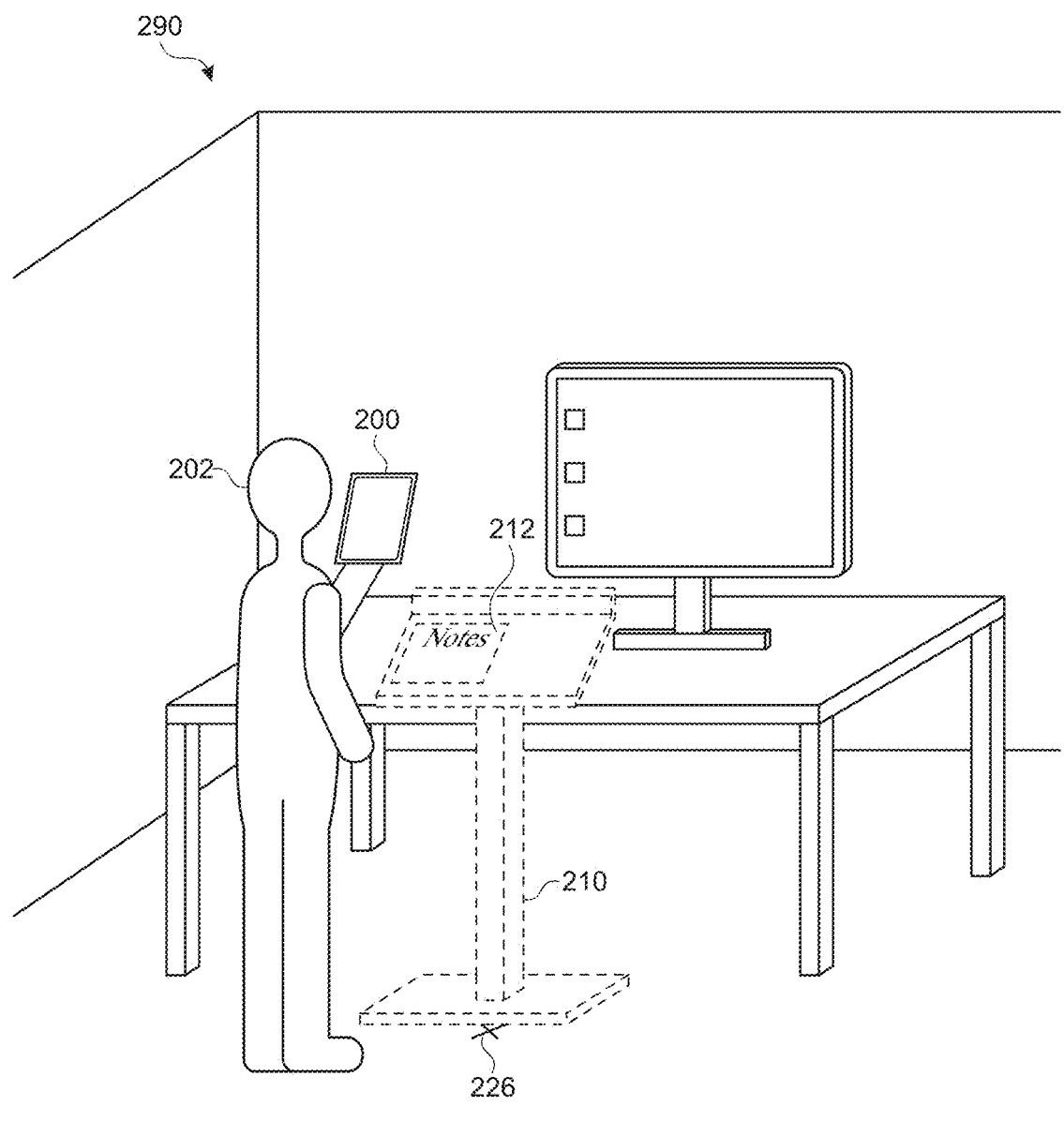

FIG. 2D shows an example of virtual object 210 displayed (e.g., by electronic device 200) on location 226. For example, a request to move virtual object 210 to location 226 may be received. The request may include a request to move virtual object 210 from any other location within CGR environment 290 (e.g., location 220, location 222, location 224, location 228, etc.). In response to the request, virtual object 210 may be moved to location 226 and a representation of virtual object 210 to be displayed (e.g., by electronic device 200) at location 226 may be determined. In this example, in response to the request to move virtual object to location 226, at least one use context corresponding to location 226 may be determined. For example, location 226 may correspond to a location on a horizontal plane (e.g., the floor) of CGR environment 290. It is noted that, in this example, location 226 corresponds to a location on a horizontal plane that is of a different type than the horizontal plane corresponding to location 224, which is a location on desktop 242. In this case, it may be determined that location 226 is associated with a use context that is satisfied by the type of location of location 226 (e.g., the type of surface), location 226 being a location on the floor of CGR environment 290. In alternative or additional embodiments, location 226 on the floor of CGR environment 290 may be determined to be a location in which virtual object 210 may be used to at least partially immersively (e.g., from a first-person-view mode) present a multimedia presentation. In either case, whether because location 226 is a location on a wall or because location 226 is a location in which the virtual object may be used to at least partially immersively present a multimedia presentation, virtual object 210 may be represented as a 3D podium placed on, or near, location 226, the podium configured to facilitate user 202 presenting the multimedia presentation from the podium. In some embodiments, the representation of virtual object 210 at location 226 may include content 212 related to the multimedia presentation (e.g., notes, annotations, presentation content, etc.), and may be presented on top of the podium where user 202 may perceive content 212.

Figure 2E:
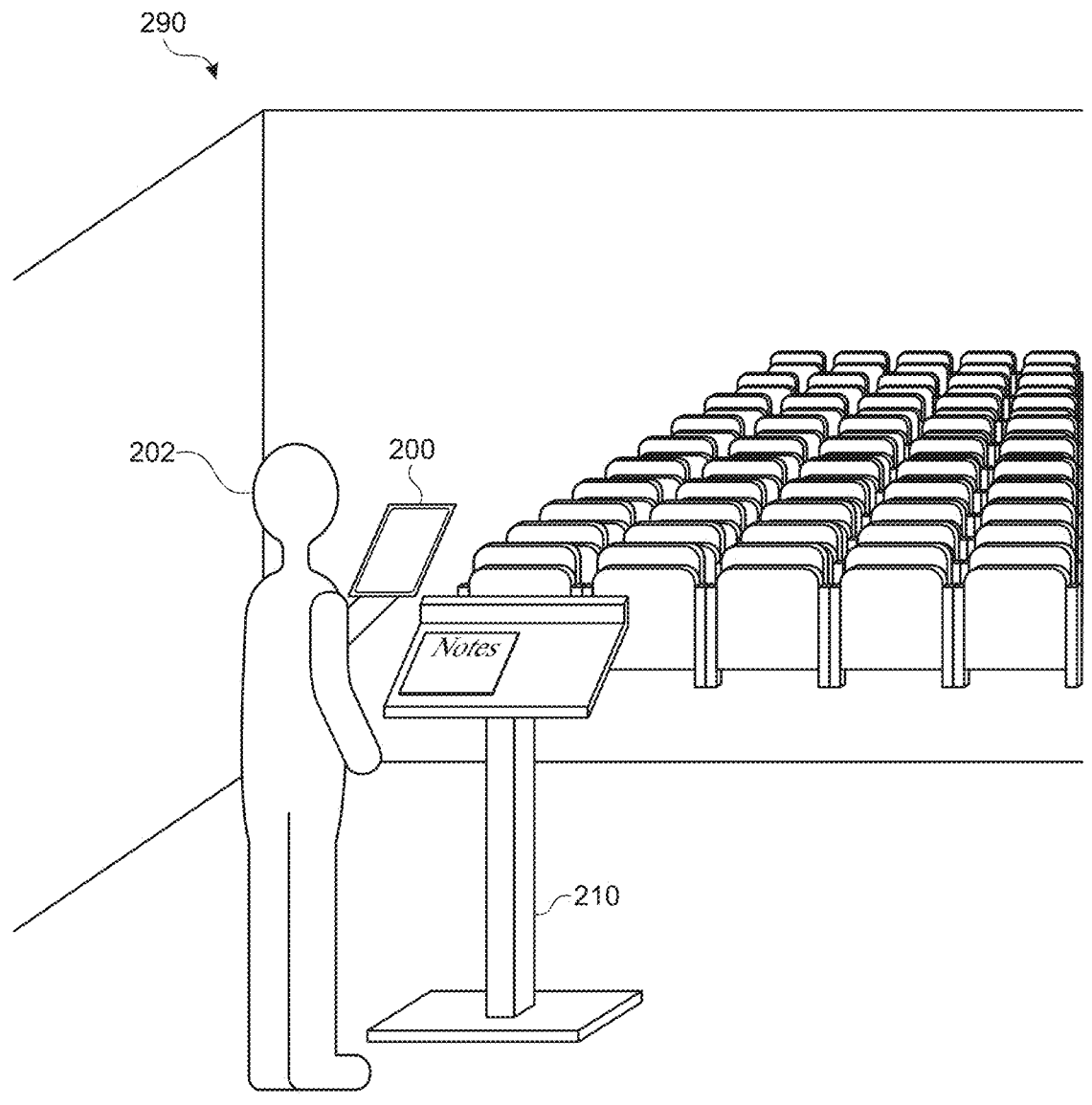

FIG. 2E shows an example of virtual object 210 being displayed (e.g., by electronic device 200) on fully-immersive mode. In some embodiments, a particular location may be associated with a fully-immersive use context. For example, a location, such as location 226 on the floor of CGR environment 290, may be associated with a use context in which the presentation is to be presented as a fully immersive experience. In response to the request to move virtual object 210 to location 226, virtual object may be moved to location 226, and a fully-immersive representation of virtual object 210 may be displayed. In this case, displaying virtual object 210 as a fully-immersive representation may include displaying the entire CGR environment 290 as a virtual auditorium configured to present the multimedia application.

In some embodiments, a representation of virtual object 210 associated with a particular use context may be displayed without having to move the virtual object to a particular location. For example, with reference back to FIG. 2A, in some embodiments, an affordance 214 may be presented within CGR environment 290. Affordance 214 may be a virtual object (e.g., a button, an affordance, a user-interface element, an interactive element, etc.) configured to allow interaction by a user (e.g., user 202). Affordance 214 may correspond to at least one use context. In some embodiments, affordance 214 may also be associated with virtual object 214 (e.g., associated with the particular application of virtual object 214 such as multimedia presentation, calculator, weather, etc.). When user 202 selects affordance 214 for virtual object 210, the use context corresponding to affordance 214 may be considered to be satisfied and may cause the associated representation (e.g., the representation of virtual object 210 associated with the use context) to be displayed. For example, where affordance 214 corresponds to the use context associated with location 224 (e.g., desktop), as shown in FIG. 2B, a representation of virtual object 210, as a 3D notepad, may be displayed by electronic device 200. In some cases, the representation of virtual object 210 may be displayed at the location associated with the use context (e.g., without having to move virtual object 210 from its current location to the location corresponding with the use context associated with affordance 214), or may be displayed at whichever location virtual object 210 is currently being displayed. In some embodiments, displaying the representation of virtual object 210 at the location associated with the use context corresponding to affordance 214 may include moving virtual object 210 from its current location to the location associated with the use context. In these cases, the moving of virtual object 210 to the location associated with the use context may be animated.

In another example, where affordance 214 corresponds to the use context associated with a fully-immersive use context, as shown in FIG. 2E, a representation of virtual object 210 as a fully-immersive experience may be displayed by electronic device 200 in response to user 202 selecting affordance 214.

In some embodiments, affordance 214 may include a plurality of affordances, each affordance in the plurality of affordances corresponding to a particular use context. In these embodiments, each affordance in the plurality of affordances may be a selectable affordance that, when selected, may cause the corresponding use context to be considered satisfied and may cause the associated representation (e.g., the representation of virtual object 210 associated with the satisfied use context) to be displayed in accordance with the foregoing.

It is noted that although the present disclosure describes embodiments in which a virtual object is displayed on a single location within the CGR environment at a time, this is done for illustrative purposes and should not be construed as limiting in any way. Indeed, in some embodiments, separate and, in some cases, different representations of the same virtual object may be displayed at more than one location within the CGR environment concurrently. In embodiments, the separate representations at the different locations may all be different (e.g., may include different information or may have different shapes and/or forms as described above), or some of the representations at the different locations may be the same while other representations at other locations may be different. In some embodiments, a change to the configuration of the virtual object (e.g., a change to an application associated with the virtual object) may trigger a change to all the representations at all the locations or may trigger a change to some representations at some locations but not all representations at all locations. In some cases, a change to a representation at one location within the CGR environment (e.g., a change caused in response to user interaction and/or caused by a change in the associated application) may trigger at least one change to at least one representation of the virtual object at another location(s) within the CGR environment.

Figure 3A:
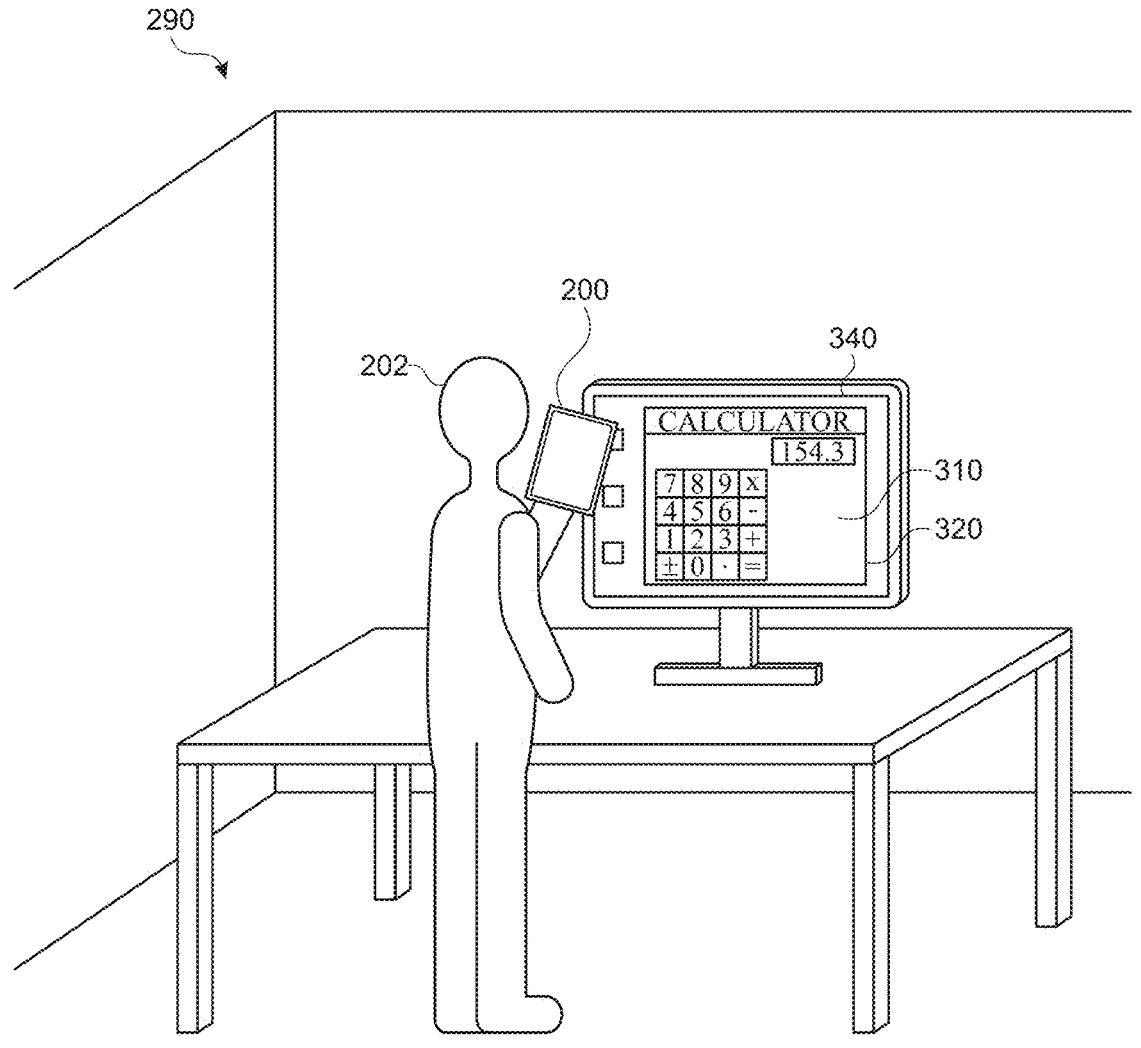
FIGS. 3A-3C depict another example of techniques for controlling a representation of a virtual object based on use contexts at different locations within a CGR environment in accordance with aspects of the present disclosure.
Figure 3B:
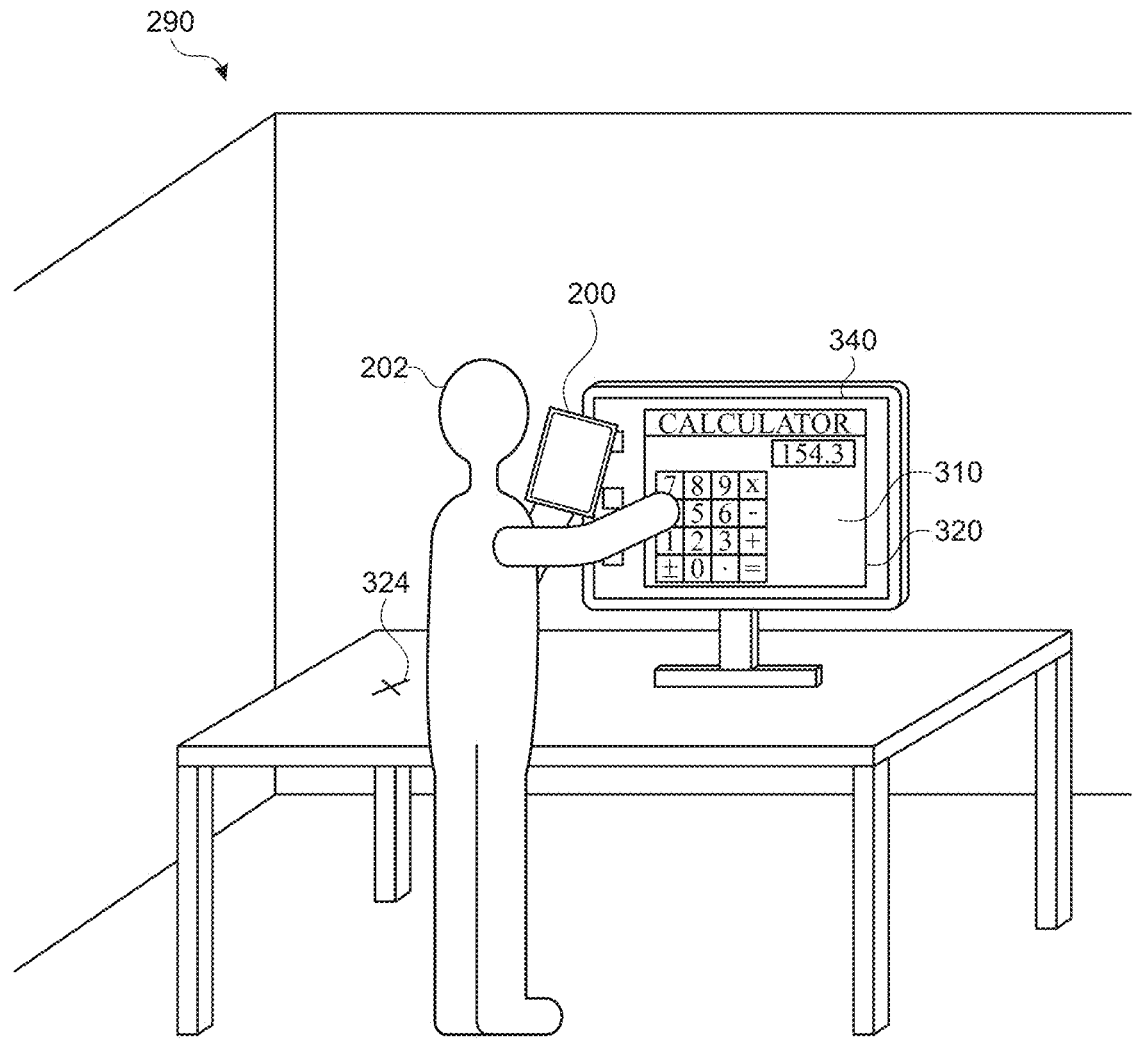
Figure 3C:
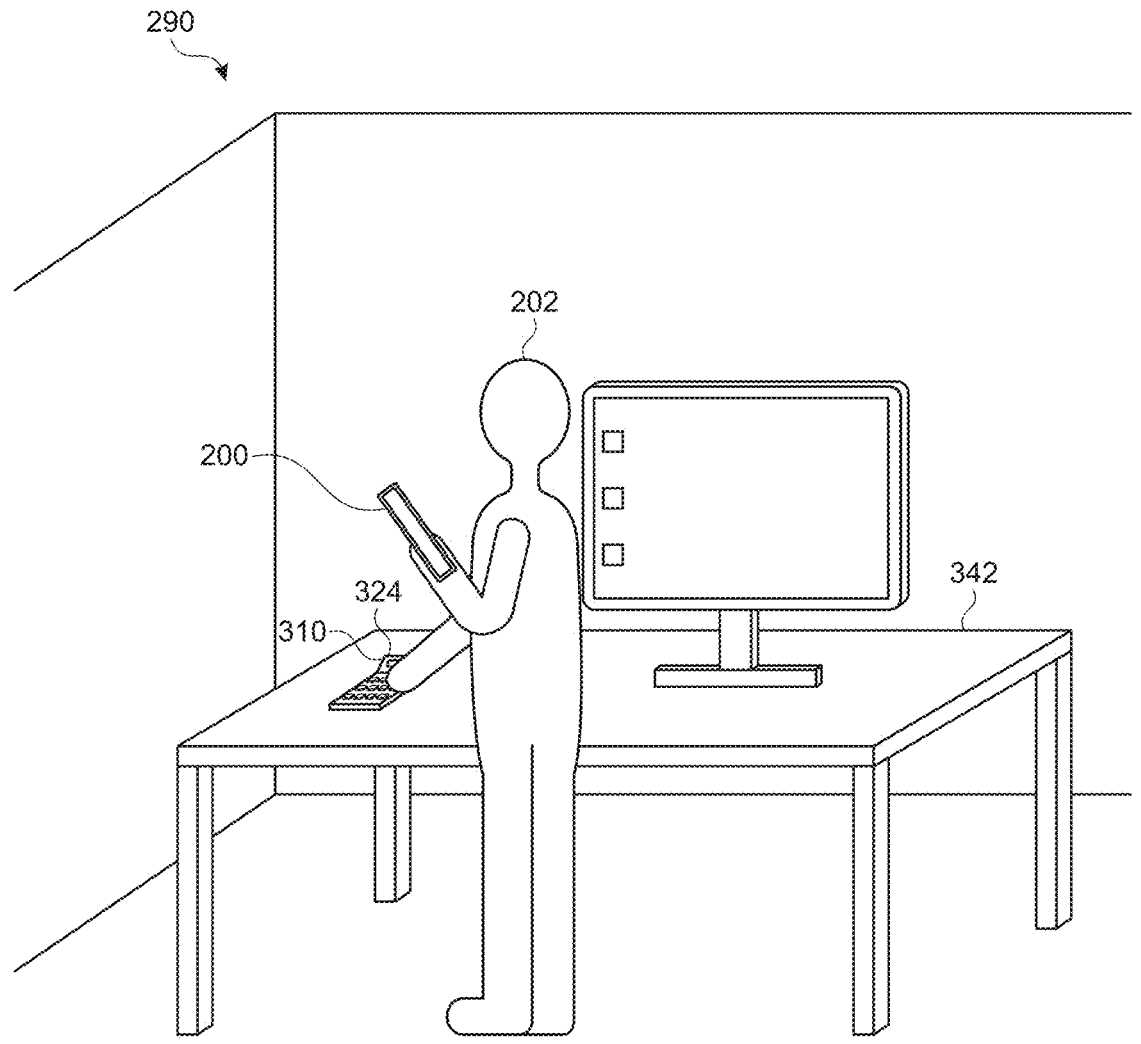

FIGS. 3A-3C illustrate an example of functionality for controlling a representation of a virtual object based on a use context associated with a location within the CGR environment in accordance with aspects of the present disclosure. In particular, FIG. 3A illustrates user 202 wearing electronic device 200, which may be configured to allow user 202 to view CGR environment 290. In some embodiments, electronic device 200 may be similar to electronic device 100a described above with reference to FIGS. 1A and 1B.

CGR environment 290 includes display 340, which may be a physical display or a virtual representation of a display. In any case, a representation of virtual object 310 may be displayed on location 320 (e.g., by electronic device 200), which is a location on display 340. In the example illustrated in FIG. 3A, virtual object 310 may be a calculator application. In this case, location 320 may be determined to correspond to at least one use context (e.g., a type of location, surface, material, etc., and/or a type of use of the virtual object at the location). For example, location 320 may be determined to be a location on an electronic device (e.g., a physical device or a computer-generated simulation of a physical device) of CGR environment 290. In this case, it may be determined that location 320 is associated with a use context that is satisfied by the type of location of location 320 (e.g., the type of surface), location 320 being a location on an electronic device. Based on the determination that location 320 is a location on an electronic device, virtual object 310 may be displayed as a 2D window or widget of the calculator application on display 340 (e.g., by electronic device 200). Thus, as will be appreciated, the representation of virtual object 310 at location 320 is based on the use context corresponding to location 320.

FIG. 3B shows user 202 interacting with virtual object 310 at location 320. The interaction of user 202 with virtual object 310 at location 320 may include a request to move virtual object 310 to another location (e.g., location 324). FIG. 3C shows virtual object 310 having been moved to location 324 in response to the request to move virtual object 310. In this example, at least one use context associated with location 324 may be determined. For example, location 324 is a location on desktop 342. In this case, it may be determined that location 324 is associated with a use context that is satisfied by the type of location of location 324 (e.g., the type of surface), location 324 being a location on desktop 342 (e.g., a location on a horizontal plane). In alternative or additional embodiments, location 324 on desktop 342 may be determined to be a location in which virtual object 310 (e.g., a calculator application) may be used, e.g., by user 202, to manipulate the calculator application in such a manner as to make entries into the calculator application as in a real-world physical calculator, for example by using user 202 hands or virtual representations thereof. In either case, whether because location 324 is a location on a desktop or because location 324 is a location in which the virtual object may be used to make entries into the calculator using a user's hand or virtual representations thereof, virtual object 310 may be represented as a 3D object (e.g., a 3D representation of a physical calculator) configured to facilitate a user making entries into the calculator application.

Figure 4A:
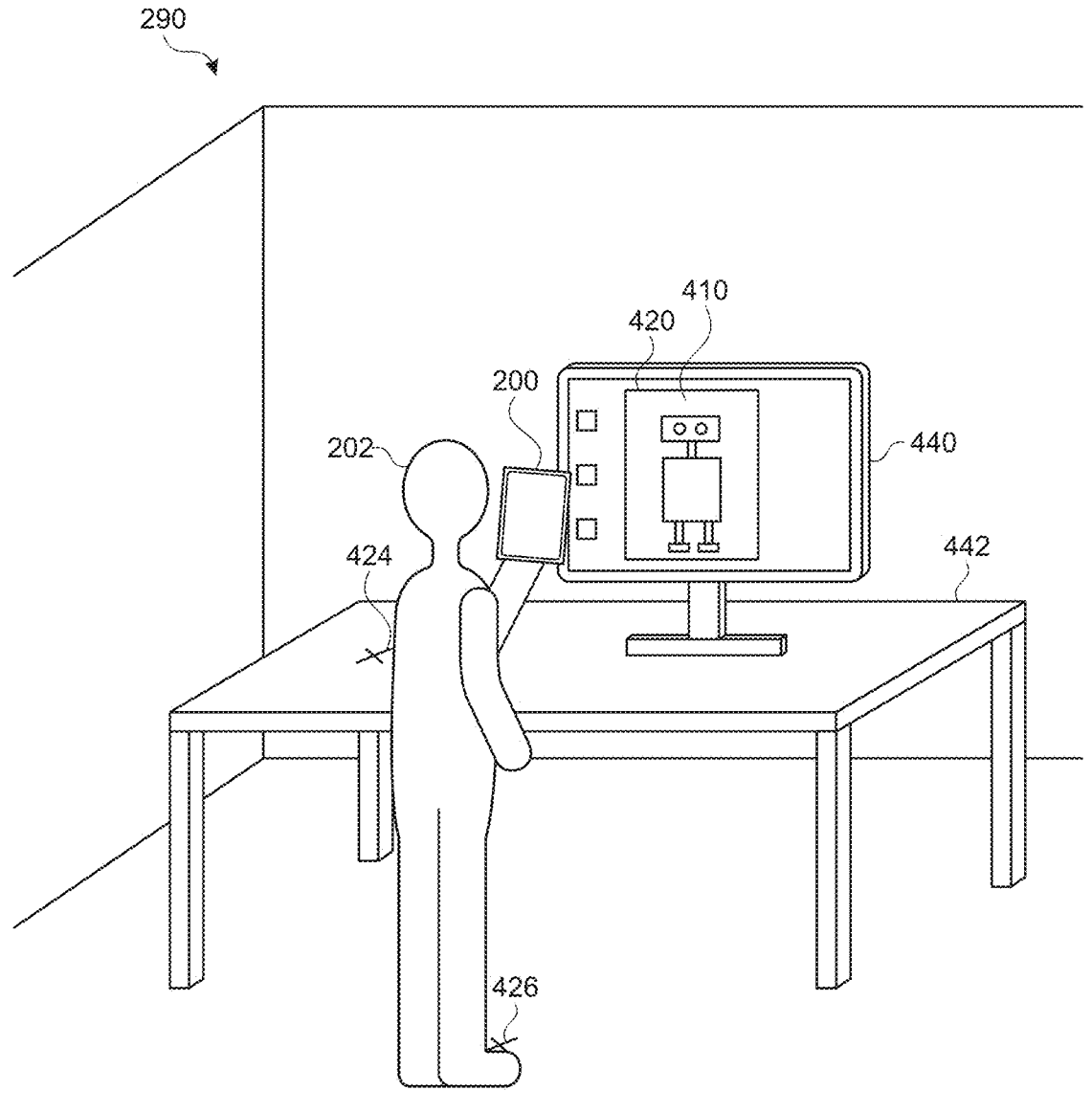
FIGS. 4A-4C depict yet another example of techniques for controlling a representation of a virtual object based on use contexts at different locations within a CGR environment in accordance with aspects of the present disclosure.
Figure 4B:
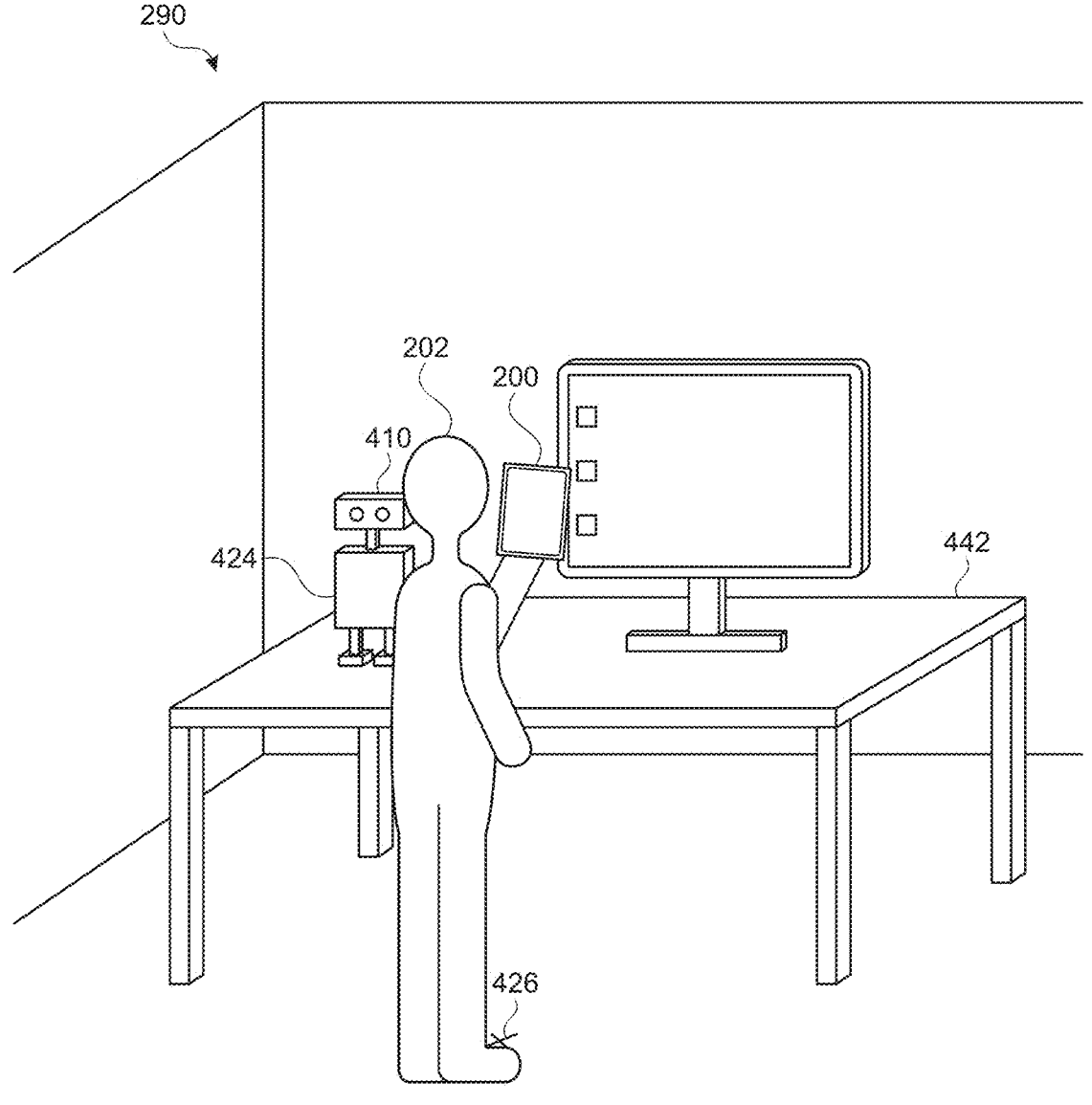
Figure 4C:
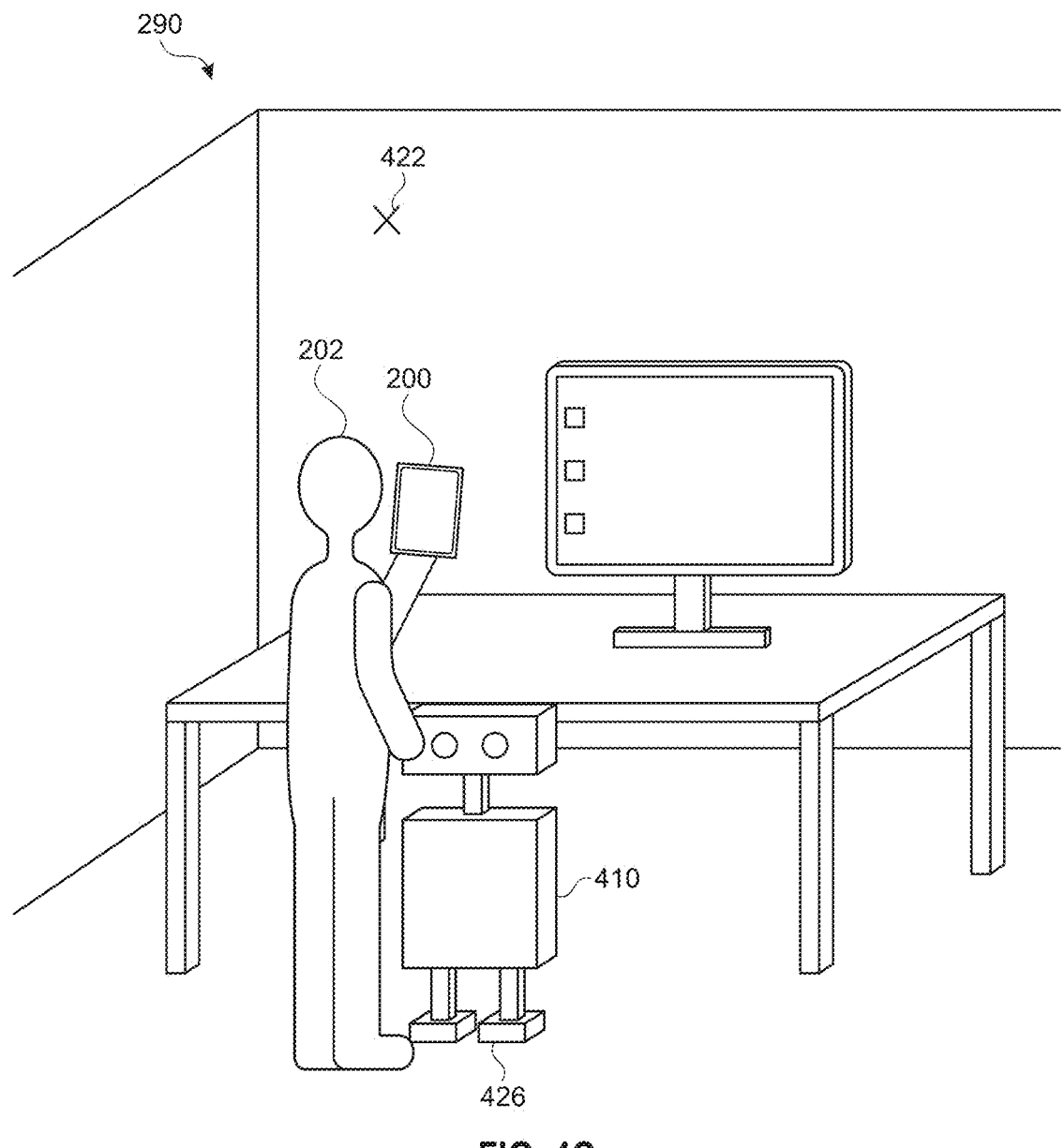

FIGS. 4A-4C illustrate another example of a representation of a virtual object of a CGR environment based on a use context associated with a location of the virtual object within the CGR environment in accordance with aspects of the present disclosure. In particular, FIG. 4A illustrates user 202 wearing electronic device 200, which is configured to allow user 202 to view CGR environment 290. As mentioned above, in some embodiments, electronic device 200 may be similar to electronic device 100a described above with reference to FIGS. 1A and 1B.

CGR environment 290 includes display 440. As described above, display 440 may be a physical display or a virtual representation of a display. A representation of virtual object 410 may be displayed by electronic device 200 on location 420, which is a location on display 440. In the example illustrated in FIG. 4A, virtual object 410 may be an application for presenting an interactive and/or animated robot. It will be appreciated that the description of an animated robot herein is for illustrative purposes only and should not be construed as limiting in any way. Indeed, the techniques herein are applicable to any application that may be represented as a virtual object within a CGR environment. In this example, location 420 may be determined to be a location on a representation of an electronic device (e.g., a representation of a display of a physical computer). Based on the determination that location 420 is a location on a representation of an electronic device, virtual object 410 may be displayed (e.g., by electronic device 200) as a 2D window or widget on display 440.

FIG. 4B shows virtual object 410 having been moved to location 424. In aspects, virtual object 410 may be moved to location 424 in response to a request by a user (e.g., a user interacting with virtual object 410 to drag or otherwise cause to move virtual object 410 to location 424. In this example, at least one use context associated with location 424 may be determined. For example, location 424 is a location on desktop 442. In this case, it may be determined that location 424 is associated with a use context that is satisfied by the type of location of location 424 (e.g., the type of surface), location 424 being a location on desktop 442 (e.g., a location on a horizontal plane). Based on the use context corresponding to location 424, virtual object 410 may be represented (e.g., displayed by electronic device 200) as a 3D object (e.g., a 3D representation of an animated robot). In embodiments, the representation of virtual object 410 when at location 424 may include different functionality than the representation of the virtual object when at location 420. For example, the animated 3D robot on desktop 442 may be configured to move around desktop 442 in more than one axis. In addition or in the alternative, the animated 3D robot on desktop 442 may be able to rotate about its own axis. Additionally, or alternatively, the animated 3D robot on desktop 442 may be configured to be of a larger size than when in location 420.

FIG. 4C shows virtual object 410 having been moved to location 426. In aspects, virtual object 410 may be moved to location 426 in response to a request by a user (e.g., a user interacting with virtual object 410 to drag or otherwise cause to move virtual object 410 to location 426. In this example, at least one use context associated with location 426 may be determined. For example, location 426 is a location on the floor of CGR environment 290. It is noted that, in this example, location 426 corresponds to a location on a horizontal plane that is of a different type than the horizontal plane corresponding to location 424, which is a location on desktop 442. In this case, it may be determined that location 426 is associated with a use context that is satisfied by the type of location of location 426 (e.g., the type of surface), location 426 being a location on the floor of CGR environment 290. Based on the use context corresponding to location 424, virtual object 410 may be represented (e.g., displayed by electronic device 200) as a 3D object (e.g., a 3D representation of an animated robot) on the floor of CGR environment 290. In embodiments, the representation of the virtual object when at location 426 may be different than when in location 424. For example, the animated 3D robot on the floor of CGR environment 290 may be larger than the animated 3D robot at location 424 on desktop 442. In addition, the animated 3D robot on the floor of CGR environment 290 may be configured to move at a faster rate than the animated 3D robot at location 424 on desktop 442.

In some embodiments, some locations within CGR environment 290 may not be associated with a use context for particular applications or may be prohibited locations with respect to a virtual object associated with a particular application. For example, location 422 may be a location on a vertical plane (e.g., a wall) of CGR environment 290. In this example, location 422 may not have an associated use context. If user 202 attempts to move virtual object 210 to location 422, the move may not be allowed, as, e.g., a 3D robot may not be able to navigate on a vertical surface. Alternatively, a default representation of the virtual object may be displayed (e.g., a 2D image or a 2D application window.

FIG. 5 is a flow diagram illustrating method 500 for controlling a representation of a virtual object of a CGR environment based on a use context associated with a location of the virtual object within the CGR environment. In some embodiments, method 500 may be performed by system 100 or a portion of system 100. In some embodiments, method 500 may be performed by one or more external systems and/or devices. In some embodiments, method 500 may be performed by system 100 (or a portion of system 100) in conjunction with one or more external systems and/or devices.

At block 502, the system displays, via a display of an electronic device (e.g., a wearable electronic device, an HMD device, etc.), a first representation of a virtual object at a first location within a CGR environment. For example, a first representation of a virtual object may be displayed via a first display (e.g., a left eye display panel) or second display (e.g., a second eye display panel) of an electronic device.

In embodiments, the first location may correspond to a first use context of a plurality of use contexts. In embodiments, the plurality of use contexts may include a use context related to a type of surface (e.g., a desk, a wall, a computer screen, a floor, etc.) and/or the type of material (e.g., sand, grass, concrete, carpet, etc.), that the virtual object will be placed on, and/or a use context that corresponds to how the virtual object will be used (e.g., manipulated, interacted with) or displayed (e.g., presented) in the first location of the CGR environment. In some embodiments, the system may be a part of the electronic device, or the electronic device may be a portion of the system.

In some embodiments, when the representation of the virtual object is displayed at the first location, the representation of the virtual object may be displayed on a first type of surface (e.g., a desk, a wall, a computer screen, a floor, etc.) and the representation of the virtual object may be displayed based on the first location (e.g., the type of surface that corresponds to the first location). In some embodiments, one or more of the plurality of use contexts may be predefined. For example, one or more of the plurality of use contexts may be predefined based on a particular application corresponding to the virtual object. In some embodiments, a first application may have a first number of predefined use contexts, and a second application may have a second number of predefined use contexts that is different from the first number of predefined use contexts. In some embodiments, the second application may have a different use context than the first application, or vice-versa.

At block 504, the system receives a request to move the first representation, within the CGR environment, to a second location that is different from the first location. In some embodiments, the request may be received or detected by the system, based on detecting movement of the first representation from the first location to the second location. In some embodiments, one or more user inputs may be detected and, in response to detecting these user inputs, the system may receive the request to move the representation to the second location. In some embodiments, the request to move the first representation from the first location to a second location may be received based on one or more determinations by an outside application, where based on the one or more determinations, the request to move the first representation from the first location to the second location is received.

At block 506, in response to receiving the request and in accordance with a determination that the second location corresponds to a second use context (e.g., the second use context being different from the first use context) of the plurality of use contexts, the system displays, via the display of the electronic device, at the second location, near the second location, and/or on a surface corresponding to the second location, a second representation of the virtual object based on the second use context, and/or based on one or more applications associated with the virtual object. In embodiments, the second representation may be different from the first representation. For example, the second representation may have a different size, shape, user interface objects, functionality, audio characteristics, surface materials, etc., and/or may be configured with one or more different and/or additional operations than the first representation.

In some embodiments, the second use context of the plurality of use context may include a use context that is satisfied when a determination is made that the second location corresponds to a location (e.g., a display, screen, a surface or case of an electronic device) on an electronic device (e.g., a computer, laptop, tablet, phone, display, projector display). In some embodiments, in accordance with the determination that the second location corresponds to the second use context of the plurality of use contexts, as a part of displaying the second representation of the virtual object based on the second use context, the system displays, within the CGR environment, a 2D representation of the virtual object on the electronic device. In some embodiments, the second representation of the virtual object may be the 2D representation on the electronic device. In some embodiments, the second representation may be moved (e.g., dragged off the display of the electronic device) to a location in the virtual environment that corresponds to a physical surface in a physical environment. In some embodiments, the 2D application may be manipulated as being a 3D application on the electronic device. In some embodiments, the second use context of the plurality of use context may include a use context that is satisfied when a determination is made that the second location corresponds to a location on an electronic device (e.g., a computer, laptop, tablet, phone, display, projector display). In these embodiments, in accordance with a determination that the second location corresponds to the second use context of the plurality of use contexts, displaying the second representation of the virtual object based on the second use context may include displaying, within the CGR environment, a 3D representation on the electronic device. In some embodiments, the representation may change depending on the type (e.g., display (e.g., monitor), tablet, personal computer, laptop) of the electronic device.

In some embodiments, the second use context of the plurality of use context may include a use context that is satisfied when a determination is made that the second location corresponds to a location on a vertical plane (e.g., a wall, a surface that corresponds to a wall-like structure, a side of a building, a bedroom wall, a fence, etc.). In some embodiments, in accordance with the determination that the second location corresponds to the second use context of the plurality of use contexts, as a part of displaying the second representation of the virtual object based on the second use context, the system displays a 2D representation on the vertical plane (e.g., on the wall) within the CGR environment. In some embodiments, the second representation of the virtual object may be the 2D representation on the electronic device. In some embodiments, the 2D representation displayed on the vertical plane (e.g., on the wall) within the CGR environment may be bigger, may have more visual content, may include one or more additional (or different) user interface objects than a 2D representation displayed on the electronic device. In some embodiments, the representation may change depending on the type (e.g., side of building, bedroom wall, fence) of vertical plane and/or one or more characteristics of a vertical plane (e.g., virtual or physical), such as size, shape (e.g., circle, rectangular), material (e.g., brick, wood, metal), texture (e.g., rough, abrasive), color, opacity, etc.

In some embodiments, the size of the second representation may be based on a distance between the display of the electronic device and the vertical plane within the CGR environment. In some embodiments, the 2D representation may be smaller when the vertical plane is closer to the display of the electronic device and larger when the vertical plan is farther away from the display of the electronic device. In some embodiments, the size of the 2D representation may be maintained as the user moves farther away or closer to the 2D representation after the 2D representation is initially displayed. In some embodiments, the size of the 2D representation may be changed as the user moves farther away or closer to the 2D representation after the 2D representation is initially displayed. In some embodiments, the size of the 2D representation may be based on whether the distance is in a certain category (e.g., categories of distance (e.g., far away, close, average distance), where each category of distances corresponds to a different size representation (e.g., extra-large, small, medium)).

In some embodiments, the second use context of the plurality of use context includes a use context that is satisfied when a determination is made that the second location corresponds to a location on a horizontal plane (e.g., a desktop, table, countertop, shelf, floor, an elevated horizontal plane, a horizontal plane that is above another horizontal plane, a horizontal plane that is not elevated, etc.) within the CGR environment. In some embodiments, in accordance with the determination that the second location corresponds to the second use context of the plurality of use contexts, as a part of displaying the second representation of the virtual object based on the second use context, the system may display a 3D representation on the horizontal plane within the CGR environment. In some embodiments, the second representation of the virtual object may be the 3D representation on the horizontal plane. In some embodiments, the representation may change depending on the type (e.g., a desktop, table, countertop, shelf) of a horizontal plane and/or one or more characteristics of horizontal plane (e.g., virtual or physical), such as size, shape (e.g., circle, rectangular), material (e.g., brick, wood, metal), texture (e.g., rough, abrasive), color, opacity, etc.

In some embodiments, in accordance with a determination that the horizontal plane is a horizontal plane of a first type, the 3D representation may be a representation of a first size. In some embodiments, in accordance with a determination that the horizontal plane is a horizontal plane of a second type, the 3D representation may be a representation of a second size that is different from (e.g., greater than) the first size. In embodiments, the first and second type of horizontal planes may be selected from types of horizontal planes that may include, for example, a predominantly horizontal plane, a structure that is a horizontal plane, a floor, a side walk, grass, lawn, a surface that one or more people are standing, a non-elevated horizontal plane, a horizontal plane that is below another horizontal plane within the CGR environment, etc.

In some embodiments, the 3D representation displayed on the horizontal plane of the first type (e.g., desktop, table, countertop, shelf) within the CGR environment may be bigger, may have more visual content, may include one or more additional (or different) user interface objects than a 3D representation displayed on the horizontal plane of the second type (e.g., floor, sidewalk, grass, lawn, a surface that one or more people are standing on).

In some embodiments, the second use context of the plurality of use contexts may include a use context that is satisfied when maximized view criteria are satisfied. For example, maximized view criteria may be satisfied when a user interface element (e.g., button, affordance, and/or any other interactive element) is selected, based on a room where the application may be running, based on the second location (e.g., a location where the virtual object is moved to or dropped), a place on a body part (e.g., place on hand) of a user of the device that corresponds to the maximized criteria being satisfied, a gesture, etc. In these embodiments, as a part of displaying the second representation of the virtual object based on the second use context, the system displays a plurality of representations of virtual objects on a plurality of planes within the CGR environment. In some embodiments, displaying a plurality of representations of virtual objects on a plurality of planes within the CGR environment may include changing one or more aspects of the physical environment and/or CGR environment to create a fully or partially immersive experience. For example, a room (e.g., physical or virtual) within the CGR environment may be turned into a virtual auditorium when the application is a presentation application, may be turned into a virtual sports venue (e.g., football stadium) when the application is a sports viewing application (e.g., fantasy sports application, live sports application), may be turned into a virtual store when shopping on a shopping application, etc. In some embodiments, the maximized view may be displayed via a companion application (e.g., fantasy sports application, live sports application, shopping application, presentation application, etc.). In some embodiments, the companion application may correspond to the virtual object and/or may be a companion application to an application that corresponds to the virtual object.

In some embodiments, the selectable virtual object that corresponds to a maximized view affordance may be displayed (e.g., a selectable virtual object that is displayed currently with a representation, such as the first representation, of the virtual object). In some embodiments, the maximized view criteria may include a criterion that is satisfied when the selectable virtual object corresponding to a maximized view affordance is selected (e.g., a tap or swipe on the virtual object).

In some embodiments, the determination may be made that the second location corresponds to the second use context of the plurality of use contexts. In some embodiments, the first representation may include first visual content (e.g., representations of text, buttons, audio/video, user interface elements, etc.). In some embodiments, the second representation may not include the first visual content.

In some embodiments, the determination may be made that the second location corresponds to the second use context of the plurality of use contexts. In some embodiments, the first representation may include third visual content that is displayed at a third size. In some embodiments, the second representation may include the third visual content that is displayed at a fourth size that is different from (e.g., larger or smaller representations of text, buttons, audio/video, user interface elements, etc.) the third size.

In some embodiments, the determination may be made that the second location corresponds to the second use context of the plurality of use contexts. In some embodiments, the first representation may include a first selectable object (e.g., one or more selectable user interface elements). In some embodiments, the second representation may not include the first selectable object.

In some embodiments, the determination may be made that the second location corresponds to the second use context of the plurality of use contexts. In some embodiments, the first representation is a fourth size. In some embodiments, the second representation is a fifth size that is different from (e.g., larger or small) the fourth size.

In some embodiments, as a part of displaying the second representation of the virtual object based on the second use context, the system may transition display of the first representation to display of the second representation when the first representation is within a predetermined distance (e.g., a distance that is near the second location, when the first representation reaches the second location) from the second location. In some embodiments, when the first representation is moved from the first location, display of the first representation is maintained until the first representation reaches or is within a certain distance of the second location.

In some embodiments, in accordance with a determination that the second location corresponds to a fourth use context of the plurality of use contexts, wherein the fourth use context is satisfied when the second location corresponds to a prohibited location (e.g., location prohibited by an application in which the virtual object corresponds and/or one or more other applications and/or systems), the system forgoes to display, within the CGR environment, a representation of the virtual object based on the fourth use context. In some embodiments, even when the second location corresponds to a location that satisfies a use context (e.g., second use context) but for the prohibition of displaying a different use context, the first representation may continue to remain displayed because display of a different representation than the first representation is prohibited and/or display of a representation that corresponds to the use context (e.g., second use context), that would be satisfied but for the prohibition of displaying a different representation, is prohibited.

In some embodiments, in accordance with the determination that the second location corresponds to the fourth use context of the plurality of use contexts, the system may display, within the CGR environment, an indication (e.g., a message or symbol that is displayed to note that a representation that corresponds to the fourth use context cannot be displayed or is prohibited) that the second location is a prohibited location (e.g., location prohibited by an application in which the virtual object corresponds and/or one or more other applications and/or systems).

At block 508, in response to receiving the request and in accordance with a determination that the second location corresponds to a third use context (e.g., the third use context is different from the first use context and the second use context) of the plurality of use contexts, the system may display, via the display of the electronic device, at the second location (e.g., on a surface corresponding to the second location), a third representation of the virtual object based on the third use context (and/or based on one or more applications associated with the virtual object), where the third representation is different from the first representation and the second representation.

Aspects of the present disclosure are directed to systems and techniques that provide functionality for controlling concurrent display of representations of a virtual object within a CGR environment. In embodiments, controlling the concurrent display of representations of a virtual object may include displaying a first representation on first surface (e.g., physical or virtual surface) of the CGR environment, and displaying a second representation on second surface of the CGR environment different from the first surface. In embodiments, controls may be provided for requesting a display of the second representation of the virtual object concurrently with the first representation of the virtual object.

Figure 6A:
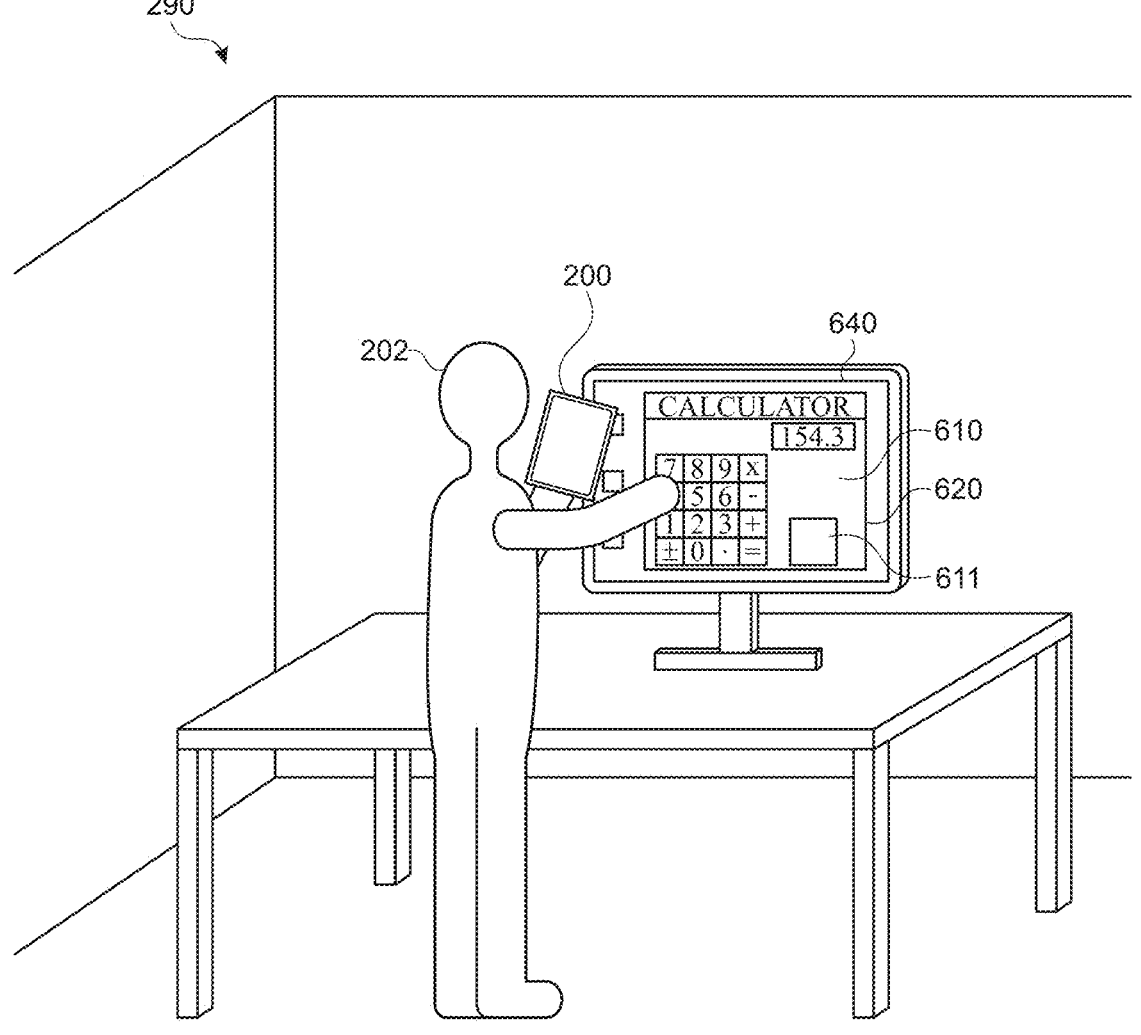
FIGS. 6A-6C depict exemplary techniques for controlling a concurrent display of representations of a virtual object within a CGR environment in accordance with aspects of the present disclosure.
Figure 6B:
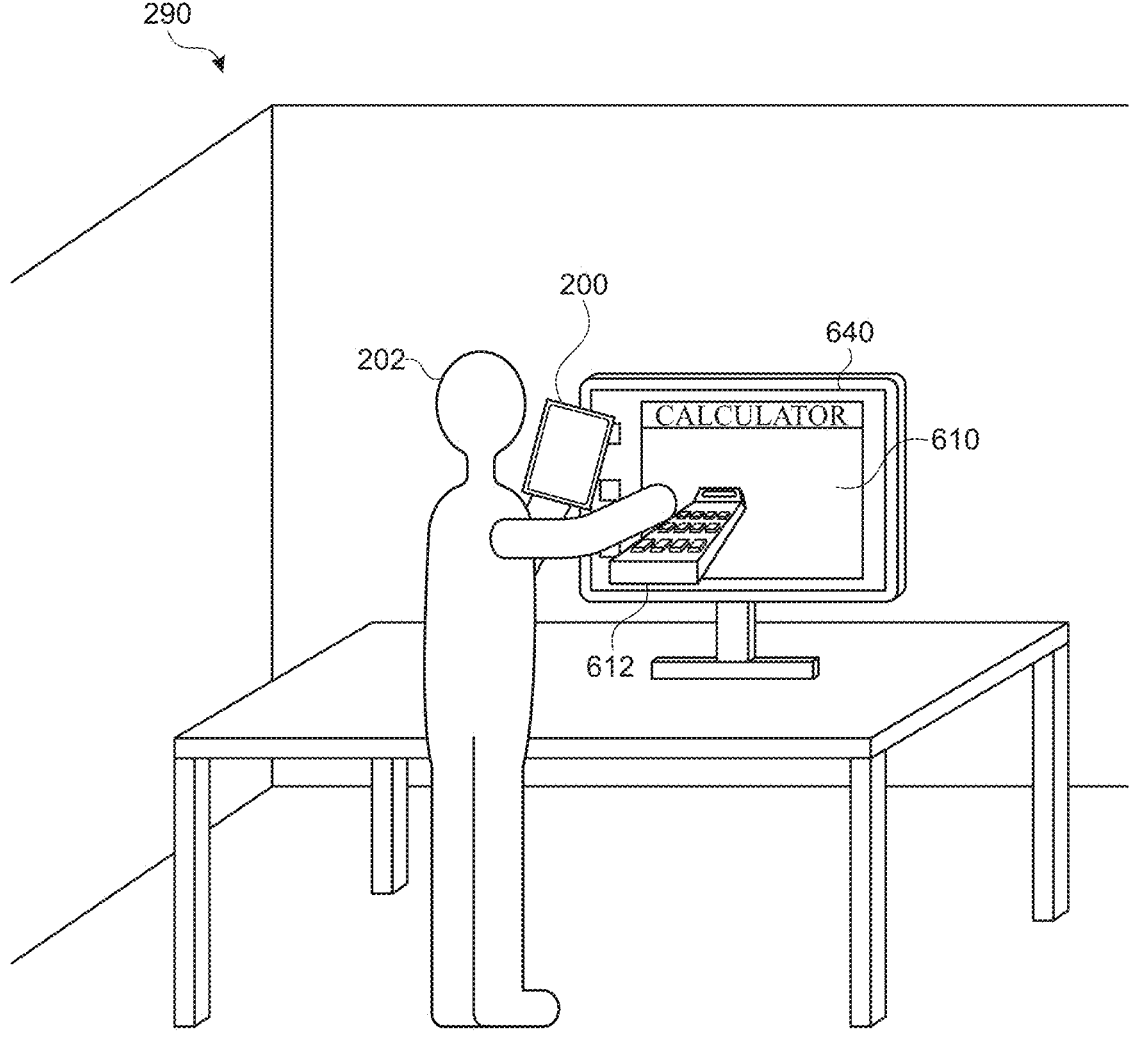
Figure 6C:
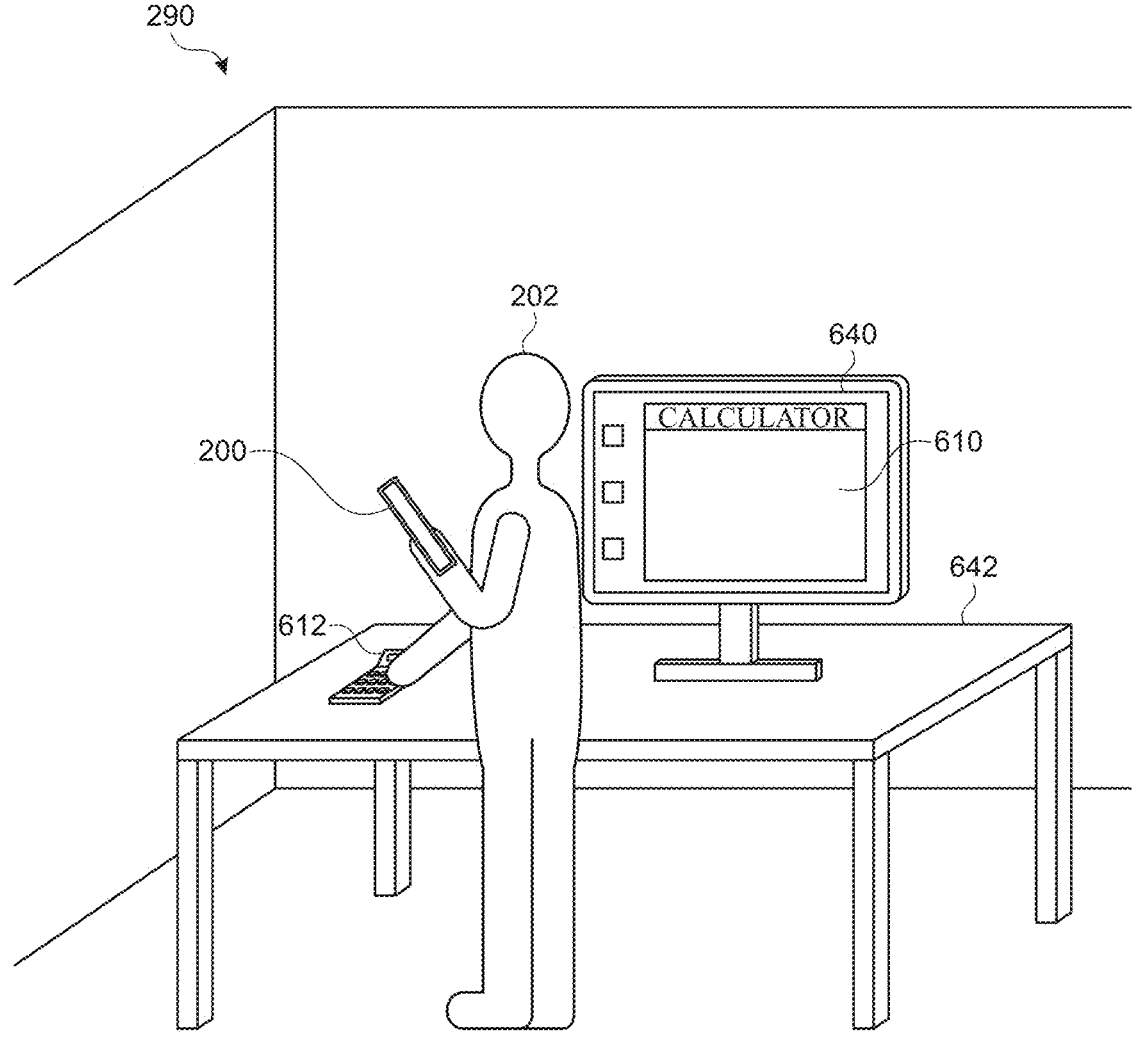

FIGS. 6A-6C illustrate exemplary techniques for controlling concurrent display of representations of a virtual object within a CGR environment in accordance with aspects of the present disclosure. In particular, FIG. 6A illustrates user 202 wearing electronic device 200, which is configured to allow user 202 to view CGR environment 290. As mentioned above, in some embodiments, electronic device 200 may be similar to electronic device 100a described above with reference to FIGS. 1A and 1B.

As illustrated in FIG. 6A, CGR environment 290 includes display 640. As described above, display 640 may be a physical display or a virtual representation of a display. A first representation 620 of virtual object 610 may be displayed by electronic device 200 at a first surface of the CGR environment. For example, first representation 620 of virtual object 610 may be displayed on display 640. In the example illustrated in FIG. 6A, first representation 620 is a 2D representation displayed on display 640. In embodiments, first representation 620 may be displayed on any surface (e.g., physical or virtual) within CGR environment 290. First representation 620 may include various graphical elements associated with the virtual object. For example, as illustrated, virtual object 610 is associated with a calculator application and includes various graphical elements associated with a calculator application. It will be appreciated that exemplifying virtual object 610 using a calculator application is done for illustrative purposes, and it is not intended to be limiting in any way. Therefore, virtual object 610 may be associated with any other type of application (e.g., calendar, multimedia application, presentation, etc.).

In some embodiments, a control may be provided for requesting a display of a second representation of virtual object 610. A user (e.g., user 202) may request the concurrent display, and the request may be received by device 200. The request to display of a second representation of virtual object 610 may include a request to display the second representation of virtual object 610 concurrently with first representation 620. The control for requesting concurrent display may include any technique for providing a selection (e.g., by user 202). For example, in some embodiments, the control for requesting concurrent display may include affordance 611 presented within CGR environment 290. In some embodiments, affordance 611 may be provided within first representation 620 or may be provided outside first representation 620. In some embodiments, affordance 611 may be a virtual object (e.g., a button, an affordance, a user-interface element, an interactive element, etc.) displayed within CGR environment 290 and configured to allow interaction by a user (e.g., user 202). In other embodiments, affordance 611 may be a graphical element displayed on a physical display (e.g., rather than a virtual element).

In embodiments, the control for requesting concurrent display may include a gesture that may include moving or dragging virtual object 610 out of display 640. For example, user 202 may perform a gesture (e.g., using an appendage, an input sensor, etc.) in which virtual object 610 may be dragged or moved out of display 640. This dragging gesture may be determined to be a request to display the second representation of virtual object 610 concurrently with first representation 620. In some embodiments, user 202 may drag virtual object 610 out of display 640 and may continue dragging virtual object to a location within CGR environment 290 where the second representation of virtual object 610 is to be displayed.

In some embodiments, the second representation of virtual object 610 may be displayed within CGR environment 290 in response to receiving the request to concurrently display representations of virtual object 610. In embodiments, the request to concurrently display representations of virtual object 610 may cause an animation in which the second representation of virtual object 610 comes out (e.g., pops out) of first representation 620. This is illustrated in FIG. 6B.

FIG. 6C illustrates second representation 621 of virtual object 610 displayed within CGR environment 290 in response to receiving the request to concurrently display representations of virtual object 610. In embodiments, second representation 621 may be displayed on any surface (e.g., physical or virtual) within CGR environment 290. In embodiments, second representation 621 may be separate and/or different from first representation 620. For example, as shown in FIG. 6C, first representation 620 may be a 2D representation of virtual object 610 displayed on display 640, and second representation 621 may be a 3D representation of virtual object 610 displayed outside of display 640, on a second and different surface of CGR environment 290. In some embodiments, a 2D representation of an object (e.g., an object within a particular application or a particular type of application (e.g., a calculator application or a keynote presentation application, a presentation application, a media or entertainment application, a productivity application)) may be displayed concurrently with a 3D representation of the object. In some embodiments, the 3D representation may be displayed with or without a 3D representation of the particular application or the particular type of application.

In some embodiments, first representation 620 and second representation 621, although associated with the same virtual object, may provide different or the same functionalities. For example, first representation 620 and second representation 621 may share a common set of UI elements. In this example, first representation 620 may be a 2D representation of an application (e.g., a calculator) that includes a particular set of UI elements for user interaction with the application. Second representation 621 may be a 3D representation of an application (e.g., a calculator) that includes the same particular set of UI elements for user interaction as first representation 620. In some embodiments, however, first representation 620 and second representation 621 may have different sets of UI elements. For example, first representation 620 may include a particular set of UI elements, while second representation 621 may include a different set of UI elements. In embodiments, one set of UI elements in the different sets of UI elements may include at least one UI element that is not included in the other set of UI elements. In other embodiments, the different sets of UI elements have no UI elements in common. As will be appreciated, by providing different functionalities, the concurrent display of representations of a virtual object provides an improved system, as the system may be configured to adapt a representation of a virtual object with functionality dependent on the type of representation (e.g., a 2D representation or a 3D representation).

In some embodiments, one representation of the virtual object may be a virtual representation, while another representation of the virtual object may not be a virtual representation. For example, display 640 may be a physical display, and first representation 620 may be a graphical representation of virtual object 610 displayed on physical display 640. In this case, first representation 620 may not be a virtual representation in that first representation 620 is actually displayed in the real-world on the physical display and is perceived by user 202 via the transparent or translucent display of electronic device 200. In this example, second representation 621 may be a virtual representation of virtual object 610 in that second representation 621 is not actually displayed in the real-world on a physical display, but it is rather displayed on the display of electronic device 200 and is superimposed over the real-world physical display. In this manner, a user may be provided with the ability to request display of a 3D representation of a virtual object by interacting with controls provided in a 2D representation of the same virtual object. In some embodiments, first representation 620 and second representation 621 may both be virtual representations.

In embodiments, modifications to one representation of the virtual object may selectively cause modifications to another representation of the virtual object. For example, while first representation 620 and second representation 621 are concurrently displayed, a request to modify first representation 620 may be received. In embodiments, a request may be received (e.g., from user 202) to modify first representation 620, for example, to modify the size, the UI elements, the shape, the theme, etc. In embodiments, the request (e.g., user input) to modify first representation 620 may cause a corresponding modification to second representation 621 (e.g., size, UI elements, shape, theme, etc.). In aspects, both first representation 620 and second representation 621 may be modified in accordance with the request to modify. In some embodiments, every time a modification to the first representation 621 is requested, a corresponding modification is made to second representation 621. In other embodiments, a first request to modify the first representation 621 may cause a corresponding modification to second representation 621. However, a second request to modify the first representation 621 may not cause a corresponding modification to second representation 621. In this case, a modification to second representation 621 is forgone when receiving the second request to modify first representation 620. It is noted that although the foregoing discussion describes selectively modifying second representation 621 based on a request to modify first representation 620, this is done for illustrative purposes and not by way of limitation. Thus, the same techniques may be used to selectively modify first representation 620 based on a request to modify second representation 621.

FIG. 7 is a flow diagram illustrating method 700 for controlling a concurrent display of representations of a virtual object within a CGR environment. In some embodiments, method 700 may be performed by system 100 or a portion of system 100. In some embodiments, method 700 may be performed by one or more external systems and/or devices. In some embodiments, method 700 may be performed by system 100 (or a portion of system 100) in conjunction with one or more external systems and/or devices.

At block 702, the system displays, via a display of an electronic device (e.g., a wearable electronic device, an HMD device, etc.), a 2D representation of a virtual object at a first surface (and/or location) of a CGR environment. For example, a first representation of a virtual object may be displayed via a first display (e.g., a left eye display panel) or second display (e.g., a second eye display panel) of an electronic device on a representation of a display within the CGR environment. In some embodiments, the first surface may be a virtual surface within the CGR environment. For example, the first surface may be a virtual representation of a physical display. In other embodiments, the first surface may be a real-world physical surface of the CGR environment. For example, the first surface may be a surface of a physical display. The 2D representation of the virtual object may be a virtual representation (e.g., a virtual representation superimposed over the first surface via a translucent display of the electronic device) or may be a real-world graphical representation (e.g., a real-world graphical representation displayed on a real-world physical display).

In some embodiments, the 2D representation of the virtual object may include a set of UI element for user interaction with the virtual object. In embodiments, the 2D representation of the virtual object may also include at least one control for requesting concurrent display of a second representation of the virtual object.

At block 704, the system receives a request to display a 3D representation of the virtual object concurrently with the 2D representation. In embodiments, the request to concurrently display may include a user input. The request may be input by a user using a control element (e.g., a button, an affordance, a user-interface element, an interactive element, etc.) displayed along with 2D representation (e.g., within the 2D representation or outside the 2D representation). For example, the user may select the control element, and the selection may cause a request for a concurrent display to be received by the system.

In some embodiments, the request to concurrently display the 2D representation and the 3D representation may include a gesture to move or drag the 2D representation out of, or from, the first surface. For example, a user 202 may grab, click, and/or otherwise select (e.g., using an appendage, an input device, an input sensor, etc.) the 2D representation displayed at the first surface and may move or drag the 2D representation away from the first surface. In some aspects, the dragging gesture may be determined to be the request for concurrent display.

In embodiments, the request to display a 3D representation of the virtual object concurrently with the 2D representation may cause an animation to be played in which the 3D representation is configured to come out (or pop out) of the 2D representation. In embodiments, the animation may include a sound that may be played during the animation.

At block 706, in response to the request for concurrent display, the system concurrently displays, via the display of the electronic device, the 2D representation at the first surface and the 3D representation at a second surface of the CGR environment. In embodiments, the second surface may be different from the first surface. In embodiments, the second surface may be a virtual surface or may be a real-world physical surface within the CGR environment. For example, the second surface may be a physical, real-world surface of a desk, or may be a virtual representation of a surface of a physical desk.

In embodiments, the second surface at which the 3D representation may be displayed may be determined by user input. For example, a user may drag the 2D representation out from the first surface and continue dragging to the second surface. In this manner, the 3D representation may be displayed in whichever surface within the CGR environment the dragging gesture stops. In other implementations, for example, where a control element in the 2D representation is used to request the concurrent display, the second surface may be predetermined. In some implementations, the user may, prior to requesting concurrent display, indicate a surface at which the 3D representation is to be displayed. For example, a user may first indicate (e.g., via a user input (e.g., user input detected using input sensors that may include a mouse, a stylus, touch-sensitive surfaces, image-sensors (e.g., to perform hand-tracking), etc.)), a surface within the CGR environment, other than the first surface. Upon requesting concurrent display, the 3D representation may be displayed at the surface indicated by the user.

In some embodiments, the 3D representation of the virtual object may include a set of UI elements for user interaction. In embodiments, the set of UI elements of the 3D representation may be different than the set of UI elements of the 2D representation. For example, one set of UI elements may include UI elements that are not included in the other set of UI elements.

Various aspects of the present disclosure are directed to systems and techniques that provide functionality for controlling a representation of a virtual object based on characteristics of an input mechanism. In embodiments, a representation of a virtual object may be based on a characteristic of the input mechanism (e.g., movement direction, distance, gesture type, etc. of the input mechanism) with respect to the virtual object. For example, in embodiments, a representation of a virtual object may be modified or maintained depending on whether an input mechanism associated with the virtual object is within a predetermined distance from a first representation of the virtual object. In other embodiments, for example, a representation of a virtual object may be modified or maintained depending on whether an input mechanism associated with the virtual object is determined to be moving towards or away from a first representation of the virtual object. In yet other embodiments, for example, a representation of a virtual object may be modified or maintained depending on whether a gesture associated with an input mechanism is determined to indicate a potential for interaction by a user with a first representation of the virtual object. As will be appreciated, the functionality provided by the systems and techniques described herein provide for an advantageous system in which representations of virtual objects may be adapted to characteristics of input mechanisms, thereby providing an improved user interface.

Figure 8A:
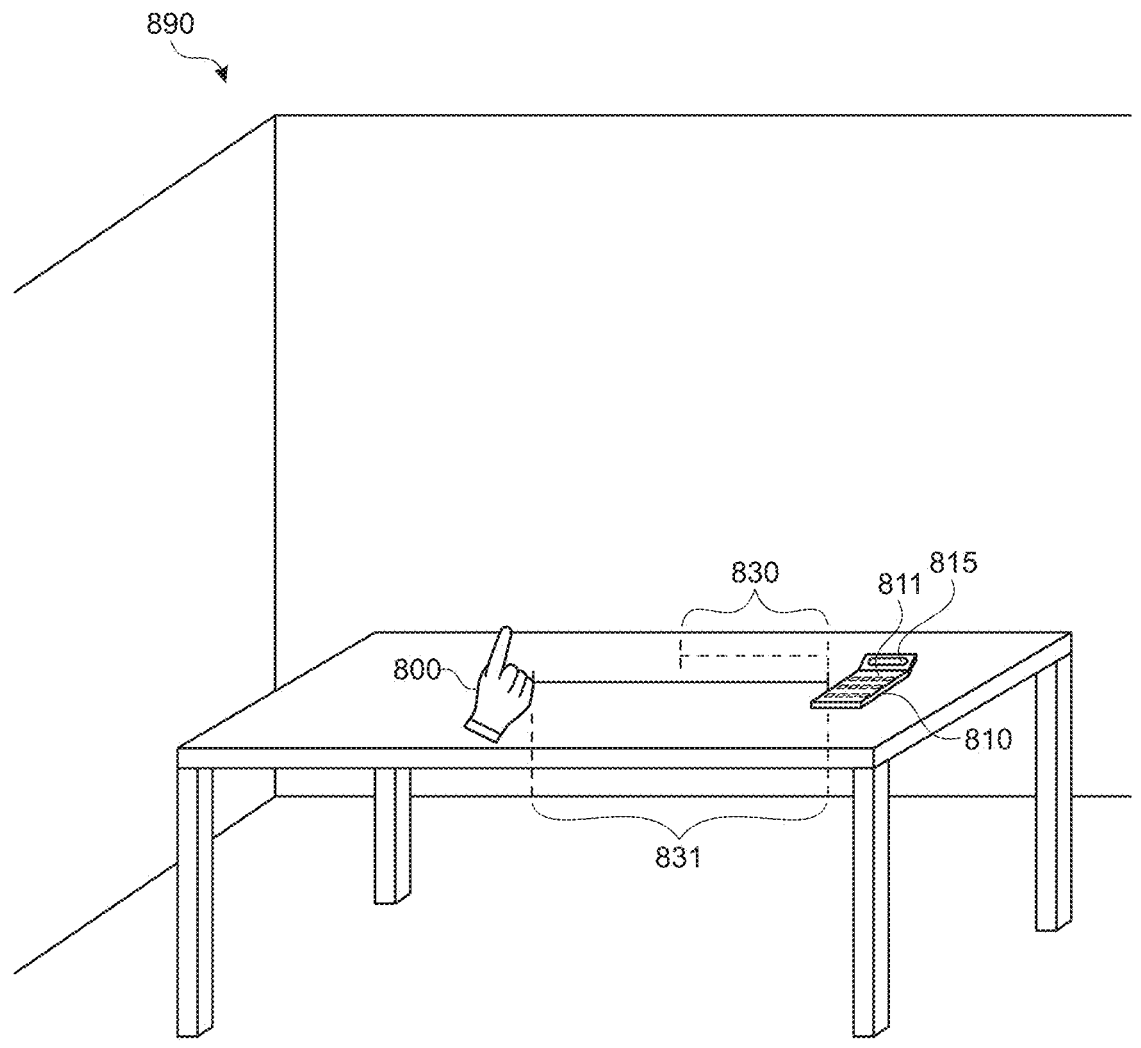
FIGS. 8A-8B depict exemplary techniques for controlling a representation of a virtual object within a CGR environment based on characteristics of an input mechanism in accordance with aspects of the present disclosure.
Figure 8B:
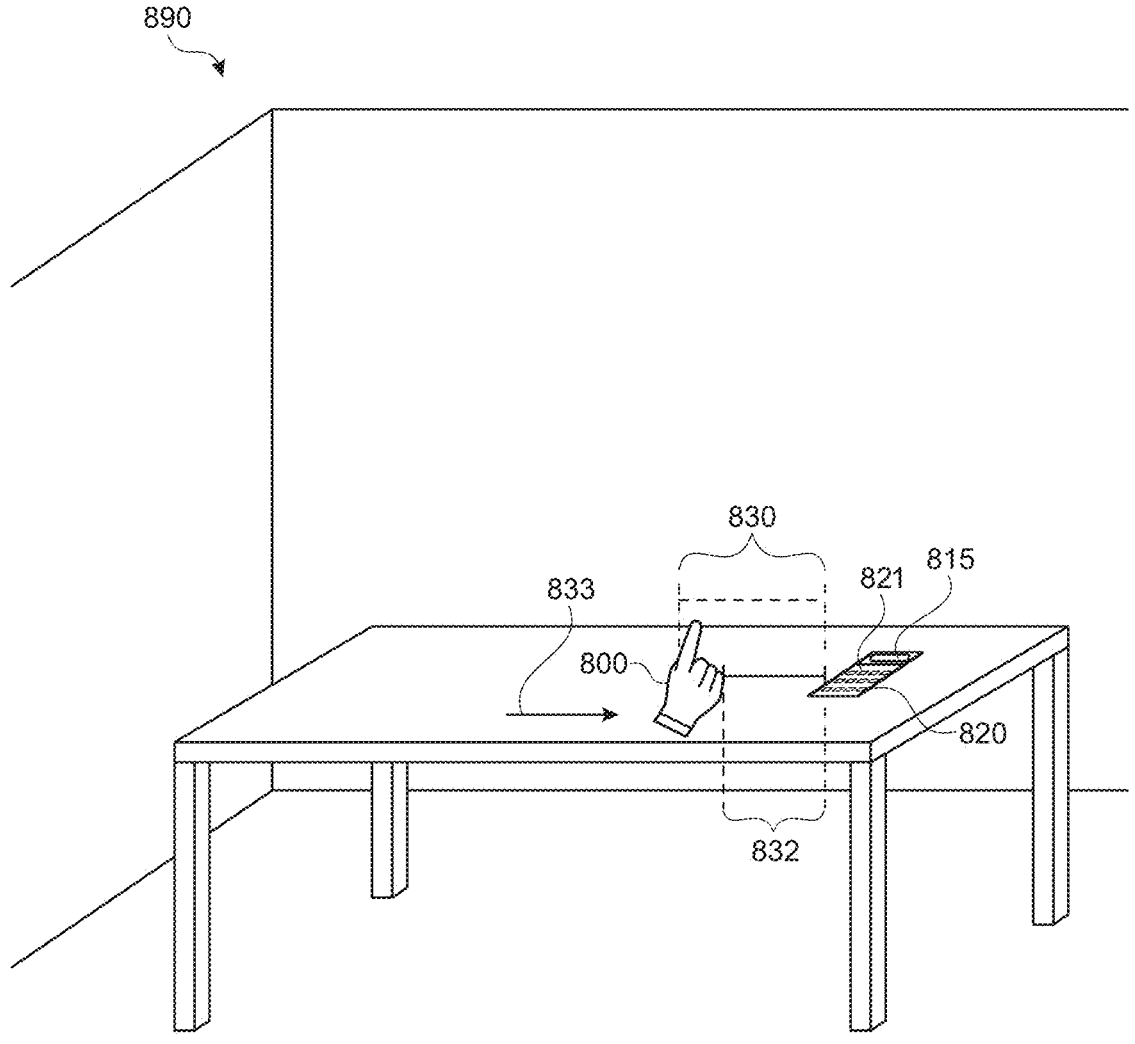

FIGS. 8A and 8B illustrate exemplary techniques for controlling a representation of a virtual object within a CGR environment based on characteristics of an input mechanism in accordance with aspects of the present disclosure. In particular, FIG. 8A illustrates CGR environment 890, including input mechanism 800 and virtual object 810. In embodiments, CGR environment 890 may be presented to a user (e.g., user 202) wearing an electronic device (e.g., electronic device 200) configured to allow user 202 to view CGR environment 890. As mentioned above, in some embodiments, electronic device 200 may be similar to electronic device 100a described above with reference to FIGS. 1A and 1B.

As shown in FIG. 8A, first representation 810 of a virtual object may be displayed by electronic device 200. In embodiments, first representation 810 may be a 3D representation of the virtual object, and the virtual object may be associated with a particular application. For example, as illustrated in FIG. 8A, first representation 810 may be associated with a calculator application. It will be appreciated that exemplifying first representation 810, and other representations of a virtual object, using a particular application (e.g., a calculator application) is done for illustrative purposes, and it is not intended to be limiting in any way. Therefore, first representation 810 may be associated with any type of application (e.g., calendar, multimedia application, presentation, etc.).

In embodiments, first representation 810 may be configured to facilitate non-direct interaction between a user and first representation 810. As used herein, non-direct interaction may refer to a user interaction with a representation of a virtual object that does not directly manipulate elements of the representation of the virtual object. A non-limiting example of a non-direct interaction may be a user perceiving information provided by a user interface (UI) element of the representation of the virtual object without direct manipulation of the UI element by the user. In contrast, direct interaction, as used herein, may refer to a user interaction with a representation of a virtual object in which UI elements of the representation of the virtual object representation may be directly manipulated by the user. For example, the user may push a button, may interact with an interactive element, may click a selectable item and/or an affordance, etc.

First representation 810 may include UI elements 811 and 815. In embodiments, UI element 815 may represent at least one UI element configured to provide (e.g., output) information associated with the virtual object represented by first representation 810. For example, UI element 815 may be a display of first representation 810. As such, UI element 815 may be configured for non-direct interaction such that a user may perceive the output without directly manipulating UI element 815. UI element 811 may represent at least one UI element that may be configurable to a configuration that facilitates user interaction (e.g., direct interaction or non-direct interaction). For example, UI element 811 may be a button, an affordance, a user-interface element, an interactive element, etc., and/or any combination thereof. When UI element 811 is configured to facilitate direct interaction, a user may select, click, select, and/or otherwise manipulate UI element 811. In some embodiments, UI element 811 may be configured to facilitate non-direct interaction by displaying UI element as a 3D element. In this case, the user may perceive UI element 811 as a 3D element.

In embodiments, input mechanism 800 may include a mechanism configured to facilitate interaction with the representations of the virtual object. For example, input mechanism may include a mechanism for a user (e.g., user 202) to manipulate at least one element of a representation of the virtual object or to perceive data provided by an element of the representation of the virtual object. In embodiments, input mechanism 800 may include a representation of an appendage of the user (e.g., a finger, hand, leg, foot, etc.), a user's gaze (e.g., head gaze, eye gaze, etc.), an input device (e.g., a mouse, a stylus, etc.) (e.g., that is different from the electronic device, that is in operative communication with the electronic device, that is physically connected to (e.g., or a part of) the electronic device), etc. In embodiments, the representation of an appendage of the user may include a virtual representation of the appendage and/or may include data representing characteristics of the appendage (e.g., location, orientation, distance to a particular point, etc.) within the CGR environment. In aspects, input mechanism 800 may be detected using input sensors (e.g., touch-sensitive surfaces, image-sensors, etc.) configured to perform hand-tracking, head gaze-tracking, eye gaze-tracking, finger-tracking, etc. As shown in FIG. 8A, input mechanism 800 may include a user's appendage (e.g., a finger).

As shown in FIG. 8A, and discussed above, first representation 810 may be displayed within CGR environment 890, and first representation 810 may be configured to facilitate non-direct interaction by a user rather than direct interaction (e.g., by providing UI elements 811 and 815 configured for non-direct interaction). As also shown in FIG. 8A, input mechanism 800 may be at a current location that is distance 831 from first representation 810. In some embodiments, a predetermined distance 830 from first representation 810 may be provided, although in some implementations, predetermined distance 830 may not be shown within CGR environment 890. Predetermined distance 830 may be configured to operate as a threshold, such that when the current location of the input mechanism is not within predetermined distance 830 from first representation 810, the displaying of first representation 810 may be maintained. For example, as distance 831 may be determined to be greater than predetermined distance 830, the current location of input mechanism 800 may be determined not to be within a predetermined distance 830 from first representation 810.

In embodiments, whether the displaying of first representation 810 may be modified or maintained may be based on a characteristic of input mechanism 800. In some embodiments, the characteristic of input mechanism 800 may include a movement direction, a distance to a representation of the virtual object, a gesture type, etc. In accordance with the determination that the current location of input mechanism 800 is not within predetermined distance 830 from first representation 810, the displaying of first representation 810 may be maintained without displaying another representation of the virtual object. Conversely, as will be discussed below, and as illustrated in the example shown in FIG. 8B, in accordance with a determination that the current location of input mechanism 800 is within predetermined distance 830 from first representation 810, the displaying of first representation 810 may be modified, and a second representation of the virtual object may be displayed. In aspects, the second representation of the virtual object may be different from first representation 810.

In some embodiments, the determination of whether the location of input mechanism 800 is within predetermined distance 830 from first representation 810 may be performed in response to detecting a movement of input mechanism 800. In these cases, if no movement of input mechanism 800 is detected, the determination of whether the location of input mechanism 800 is within predetermined distance 830 from first representation 810 may not be performed. In some embodiments, the determination of whether the location of input mechanism 800 is within predetermined distance 830 from first representation 810 may be performed when a detected movement is determined to be towards first representation 810. In these cases, if the movement of input mechanism 800 is determined to be away from first representation 810, the determination of whether the location of input mechanism 800 is within predetermined distance 830 from first representation 810 may not be performed even though a movement of input mechanism 800 may be detected.

In some implementations, first representation 810 may be initially displayed within CGR environment 890 in response to a determination that input mechanism 800 is not within predetermined distance 830 from a location at which first representation 810 is to be displayed. For example, a determination may be made to initially display a representation of a virtual object at a first location within CGR environment 890. In this example, the first representation of the virtual object may be configured for non-direct interaction. Further, in this example, CGR environment 890 may not include any representation of the virtual object at the first location, although in some cases at least one other representation of the virtual object may be displayed at another location within CGR environment 890. In response to the determination to initially display a representation of the virtual object at the first location within CGR environment 890, a determination may be made as to whether the current location of input mechanism 800 is within predetermined distance 830 from the first location or not. If it is determined that the current location of input mechanism 800 is not within predetermined distance 830 from the first location, the first representation (e.g., first representation 810) may be displayed at the first location. In some embodiments, if it is determined that the current location of input mechanism 800 is within predetermined distance 830 from the first location, a second representation (e.g., second representation 820 described below) configured for direct interaction may be displayed at the first location.

As shown in FIG. 8B, input mechanism 800 may be moved (e.g., in direction 833) from a previous location (e.g., as illustrated in FIG. 8A) to a current location with a distance 832 to first representation 810. The movement from the previous location to the current location may be detected (e.g., using input sensors as described above). In response to detecting the movement of input mechanism 800 from the previous location to the current location, a determination may be made as to whether the current location of input mechanism 800 to first representation 810 may be within predetermined distance 830 or not. For example, distance

832 from the current location of input mechanism 800 to the first representation 810 may be compared against predetermined distance 830. In accordance with a determination that the distance 832 is greater than predetermined distance 830, the current location of input mechanism 800 may be determined to not be within predetermined distance 830 from first representation 810. Conversely, in accordance with a determination that the distance 832 is not greater than predetermined distance 830, the current location of input mechanism 800 may be determined to be within predetermined distance 830 from first representation 810.

In embodiments, in accordance with a determination that the current location of input mechanism 800 is within predetermined distance 830 from first representation 810, the displaying of first representation 810 may be modified. In embodiments, modifying the displaying of first representation 810 may include ceasing to display first representation 810 and displaying second representation 820, where second representation 820 may be different from first representation 810. In some embodiments, second representation 820 may be displayed at the same location and/or on the same surface where first representation 810 was displayed.

In embodiments, second representation 820 may be configured for direct interaction between the user (e.g., user 202) and second representation 820 (e.g., elements of second representation 820). For example, whereas first representation 810 includes UI element 811, as shown in FIG. 8A, configured for non-direct interaction (e.g., UI elements displayed as protruding 3D UI elements), second representation 820 may include UI element 821 configured for direct interaction. In this example, UI element 821 may include at least one UI element displayed as flat buttons, or as 2D elements, where the flat buttons may not protrude from second representation 820. As will be appreciated, a flat 2D UI element (e.g., a 2D button) displayed upon a physical table (e.g., on the same plane as the physical table, may be more apt to provide physical feedback when a user manipulates the 2D element. For example, as the user manipulates the 2D element, the user receives the feedback provided by the physical table upon which the virtual 2D element I displayed. In addition, displaying second representation 820 configured for direct interaction may also encourage the user (e.g., user 202) to interact with second representation 820.

In some embodiments, modifying first representation 810, which may include displaying second representation 820, may include animating the modification. For example, one of the differences between first representation 810 and second representation 820 may be that UI element 811 of first representation 810 is displayed as protruding 3D UI elements and UI element 821 of second representation 820 is displayed as flat 2D UI elements. In this example, the modification of first representation 810 may include animating the UI elements such that the protruding 3D UI elements of first representation 810 are presented as receding into the flat 2D UI elements of second representation 820. In embodiments, the animation may also include a sound that may be played while the animation is occurring.

In another embodiment, modifying the first representation of the virtual object may include moving the first representation to a location closer to the user (e.g., user 202). For example, based on the characteristic of the input mechanism 800 (e.g., the current location of input mechanism 800 is within a predetermined distance (e.g., predetermined distance 830) from the current location of the first representation (e.g., first representation 810)), a second representation of the virtual object may be displayed. In embodiments, the second representation of the virtual object may be the same as the first representation but in a location that is closer to the user than the current location of the first representation. In some embodiments, the second representation displayed at the new location may be a different representation of the first representation, for example, in accordance with the above description.

In further embodiments, the characteristic of the input mechanism on which the determination to modify or maintain the first representation 810 may be based may include a determination of whether the direction of the movement of input mechanism 800 is toward or away from first representation 810. For example, as shown in FIG. 8B, input mechanism 800 may be moved in direction 833, which is a direction toward first representation 810. In this case, in accordance with the determination that the direction of the movement of input mechanism 800 is toward first representation 810, the displaying of first representation 810 may be modified and a second representation (e.g., second representation 820 configured to facilitate direct interaction by a user) of the virtual object may be displayed. Conversely, in accordance with the determination that the direction of the movement of input mechanism 800 is away from first representation 810, the displaying of first representation 810 may be maintained without displaying another representation (e.g., second representation 820) of the virtual object. In aspects, the second representation of the virtual object may be different than first representation 810.

In yet further embodiments, the characteristic of the input mechanism on which the determination to modify or maintain the first representation 810 may include a determination of whether a particular type of gesture has been made by input mechanism 800. In aspects, the particular type of gesture may be a gesture that may indicate a potential for direct user interaction. For example, as shown in FIG. 8B, input mechanism 800 may be a pointing hand. In embodiments, a pointing hand may be considered a type of gesture that indicates a potential for user interaction. As will be appreciated, a user desiring to interact with a virtual object, such as a virtual object represented with UI elements for user input, using a finger may do so by forming his or her hand into a pointing hand with the finger pointing out. In this sense, the pointing hand may indicate that the user intends or desires to interact with the virtual object. As such, when a determination is made that input mechanism has made a gesture that indicates a potential for user interaction (e.g., pointing hand, grabbing hand, etc.), a determination may be made to modify a current representation configured for non-direct interaction (e.g., first representation 810) into a representation configured for direct interaction (e.g., second representation 820). In aspects, the modification of the current representation configured for non-direct interaction into a representation configured for direct interaction may be in accordance with the foregoing description.

In another example, a determination to maintain the displaying of first representation 810 configured for non-direct interaction may be based on a gesture that does not indicate a potential for user interaction. For example, a gesture may be detected that may include the user (e.g., user 202) crossing his or her arms, and/or leaning back. In this case, the gesture may be considered a type of gesture that does not indicate a potential for user interaction. As such, when a determination is made that the user has crossed his or her arms, and/or has leaned back, a determination may be made to maintain a current representation configured for non-direct interaction (e.g., first representation 810) without displaying a representation configured for direct interaction (e.g., second representation 820). In some embodiments, detecting a gesture that does not indicate a potential for user interaction may cause a determination to modify a current representation configured for direct interaction (e.g., second representation 820) into a representation configured for non-direct interaction (e.g., first representation 810).

It is noted that although the foregoing examples, and the examples that follow, may be focused on a description of modifications of a representation of a virtual object configured for non-direct interaction into a representation of the virtual object configured for direct interaction, this is done for illustrative purposes and not intended to be limiting in any way. In some embodiments, a representation of a virtual object configured for direct interaction may be modified into a representation of the virtual object configured for non-direct interaction based on characteristics of the input mechanism. For example, in some implementations, a display of a representation configured for direct interaction (e.g., first representation 810 described above) may be modified to display a representation configured for non-direct interaction (e.g., second representation 820 described above) based on a detected movement of an input mechanism, based on a characteristic of the input mechanism (e.g., in accordance with a determination that the location of the input mechanism is not within a predetermined distance from the representation configured for direct interaction (e.g., first representation 810)). As such, the present disclosure provides techniques for selectively and dynamically configuring a representation of a virtual object enhanced interaction (e.g., direct or non-direct) based on the characteristics of the input mechanism. Thus, the representation of the virtual object may be configured for direct or non-direct interaction when it is more advantageous based on the characteristics of the input mechanism.

Additionally, although the foregoing discussion describes second representation 820 as configured for direct interaction with flat 2D UI elements, it will be appreciated that this is done for illustrative purposes and not by way of limitation. As will be appreciated, a representation of a virtual object may be configured for direct interaction by other methods (e.g., orientation, size, angle, shape, color, brightness, language, location, distance, direction, etc.). For example, in embodiments, based on a characteristic of the input mechanism (e.g., in accordance with a determination that the current location of an input mechanism is within a predetermined distance from a first representation of a virtual object), the displaying of the first representation may be modified, and the modification may include displaying a second representation different from the first representation. In these embodiments, the second representation may include a different orientation, size, angle, shape, color, brightness, language, location, distance, direction, etc. from the first representation, where the modification may be configured to allow, encourage, enable, and/or otherwise facilitate direct interaction with the second representation of the virtual object. Some of these embodiments will be described in further detail below.

Figure 9A:
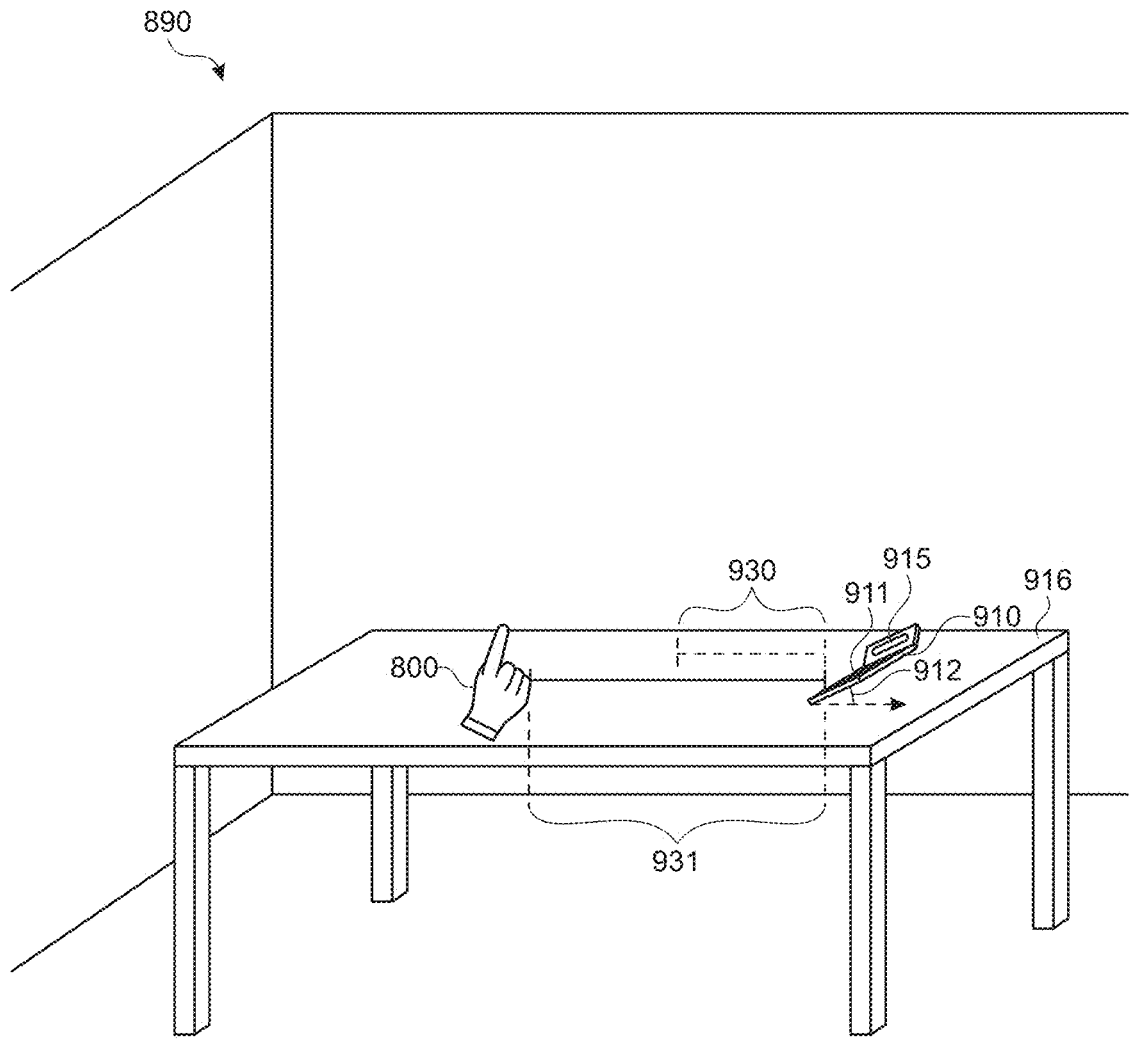
FIGS. 9A-9B depict another example of techniques for controlling a representation of a virtual object within a CGR environment based on characteristics of an input mechanism in accordance with aspects of the present disclosure.
Figure 9B:
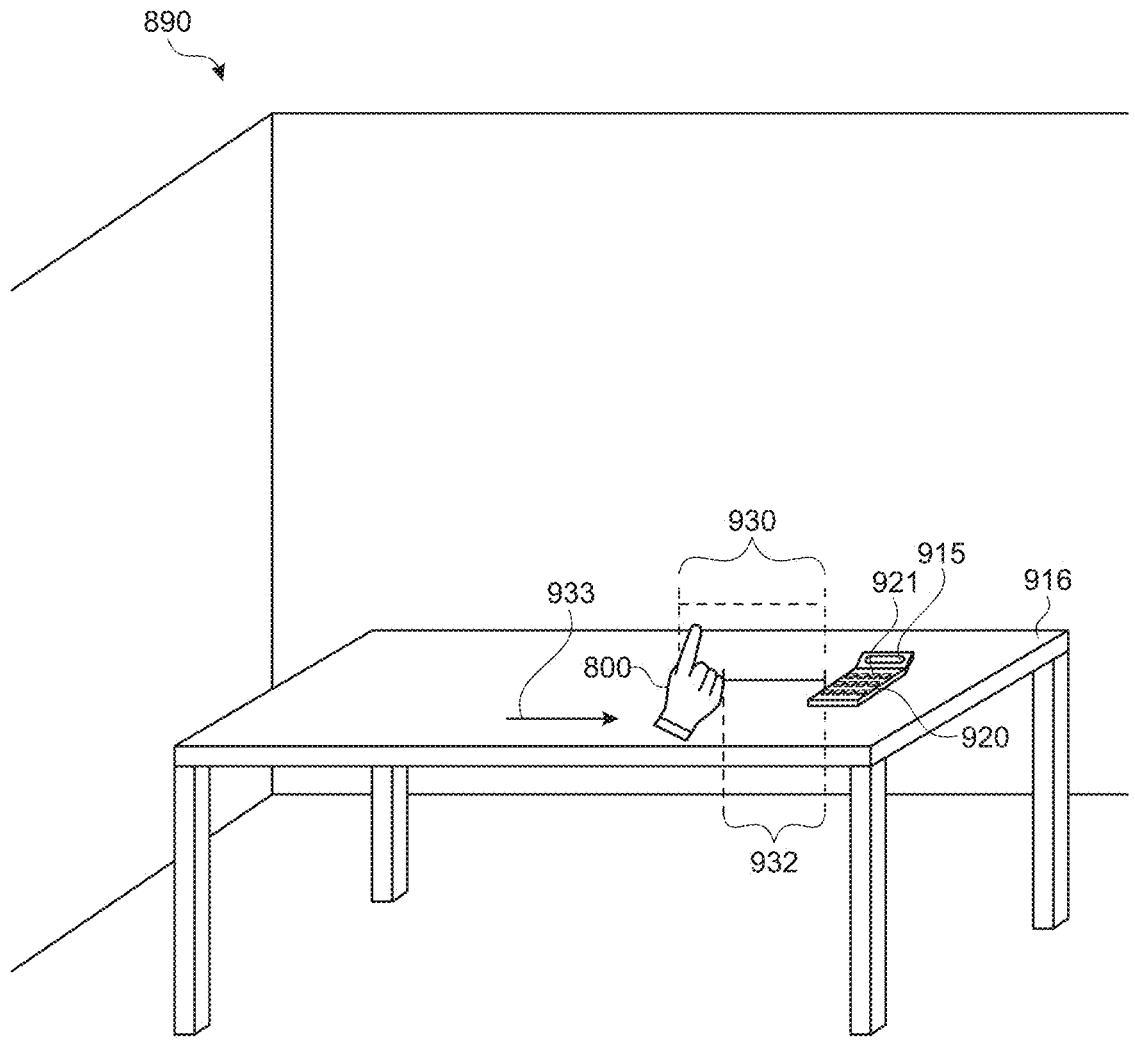

FIGS. 9A and 9B illustrate another example of techniques for controlling a representation of a virtual object within a CGR environment based on characteristics of an input mechanism in accordance with aspects of the present disclosure. As shown in FIG. 9A, first representation 910 of a virtual object may be displayed via a display of electronic device 200. In embodiments, first representation 910 may be a 3D representation of the virtual object, and the virtual object may be associated with a particular application (e.g., calendar, multimedia application, presentation, etc.), as discussed above. In the example illustrated in FIG. 9A, first representation 910 may be associated with a calculator application.

In embodiments, first representation 910 may be configured to facilitate non-direct interaction with the associated virtual object. For example, first representation 910 may include UI elements 911 and 915. In embodiments, UI element 915 may represent at least one UI element configured to provide (e.g., output) information associated with the virtual object represented by first representation 910. For example, UI element 915 may be a display (e.g., a virtual display) of first representation 910. In this case, first representation 910 may be configured to facilitate non-direct interaction by a user by being displayed at an orientation that facilitates the user (e.g., user 202) non-direct interaction with UI element 915. For example, first representation 910 may be displayed at an orientation that includes angle 912. In embodiments, angle 912 may be an angle that is configured to place first representation 910 at an orientation that enables the user to see, hear, or otherwise perceive, UI element 915. In this manner, angle 912 facilitates the user non-direct interaction with UI element 915. In embodiments, angle 912 may be measured with respect to a surface (e.g., surface 916) on which first representation 910 is displayed.

In embodiments, the orientation at which first representation 910 may be displayed may be determined based on the location of the user. For example, the user's gaze (e.g., head gaze and/or eye gaze) may be determined (e.g., by detecting the location of the user's head and/or eyes and then determining the user's gaze), and the determined user's gaze may then be used to determine an orientation at which to display first representation 910 such that UI elements configured for non-direct interaction (e.g., UI element 915) are facing the user's gaze.

In embodiments, UI element 911 of first representation 910, may be configured for non-direct interaction. In this case, UI element 811 may be displayed as protruding buttons, or as 3D elements, where the flat buttons may not protrude from first representation 910. In this manner, UI element 911, as shown in FIG. 9A, is not configured for direct interaction.

As shown in FIG. 9A, and as discussed above, first representation 910 may be configured to facilitate non-direct interaction by a user rather than direct interaction (e.g., by providing protruding 3D UI element 911 and by orienting first representation 910 at angle 912). As also shown in FIG. 9A, input mechanism 800 may be at a current location that is distance 931 from first representation 910. In some embodiments, predetermined distance 930 from first representation 910 may be provided.

In embodiments, in accordance with a determination that the current location of input mechanism 800 is not within predetermined distance 930 from first representation 910, the displaying of first representation 910 may be maintained. For example, first representation 910 configured for non-direct interaction may continue to be displayed without displaying another representation of the virtual object and/or without making changes to first representation 910. Conversely, as will be discussed below, in accordance with a determination that the current location of input mechanism 800 is within predetermined distance 930 from first representation 910, the displaying of first representation 910 may be modified and a second representation of the virtual object may be displayed. In aspects, the second representation of the virtual object may be different than first representation 910.

As shown in FIG. 9B, input mechanism 800 may be moved, e.g., in direction 933, from a previous location (e.g., as illustrated in FIG. 9A) to a current location with a distance 932 to first representation 910. The movement from the previous location to the current location may be detected (e.g., using input sensors as described above). In response to detecting the movement of input mechanism 800 from the previous location to the current location, a determination may be made as to whether the current location of input mechanism 800 to first representation 910 may be within predetermined distance 930 or not. For example, distance 932 from the current location of input mechanism 800 to the first representation 910 may be compared against predetermined distance 930. In accordance with a determination that the distance 932 is greater than predetermined distance 930, the current location of input mechanism 800 may be determined to not be within predetermined distance 930 from first representation 910. Conversely, in accordance with a determination that the distance 932 is not greater than predetermined distance 930, the current location of input mechanism 800 may be determined to be within predetermined distance 930 from first representation 910.

In embodiments, in accordance with a determination that the current location of input mechanism 800 is within predetermined distance 930 from first representation 910, the displaying of first representation 910 may be modified. In embodiments, modifying the displaying of first representation 910 may include ceasing to display first representation 910 and displaying second representation 920, where second representation 920 may be different from first representation 910. In some embodiments, second representation 920 may be displayed at the same location and/or on the same surface where first representation 910 was displayed.

In embodiments, second representation 920 may be configured to facilitate direct interaction by the user (e.g., user 202) with the associated virtual object. For example, whereas first representation 910 is displayed at an orientation with angle 912, which facilitates the user being able to perceive (e.g., see, hear, etc.) information provided by UI element 915 (e.g., non-direct interaction), second representation 920 may be displayed at an orientation that facilitates the user directly interacting (e.g., directly manipulating, selecting, clicking, dragging, and/or otherwise selecting) with UI elements of second representation 920 (e.g., UI element 921). For example, second representation 920 may be displayed within CGR environment 890 at an orientation that is longitudinal with surface 916. As such, second representation 920 may be displayed as lying flat on surface 916. As will be appreciated, a flat surface may be easier to interact with than an angled surface. As such, by modifying the representation of the virtual object from an angled orientation to a flat orientation, or vice-versa, the representation of the virtual object is selectively adapted for enhanced direct-interaction based on the characteristics of the input mechanism. In some embodiments, second representation 920 may be displayed at an orientation having a non-zero angle with respect to surface 916 that is different from angle 912.

In addition, whereas first representation 910 includes UI element 911, as shown in FIG. 9A, configured for non-direct interaction (e.g., UI elements displayed as protruding 3D UI elements, where the protruding 3D UI elements may protrude (or pop out) from first representation 910), second representation 920 may include UI element 921 configured for direct interaction, as previously described. For example, UI element 921 may include at least one UI element displayed as flat 2D UI elements displayed upon a physical object, which facilitates physical feedback as the user manipulates the 2D UI elements.

In some embodiments, modifying first representation 910, which may include displaying second representation 920, may include animating the modification. For example, the modification of first representation 910 may include animating a change in orientation of first representation 910 such that first representation 910 is displayed as moving from the current orientation (e.g., angled at angle 912) to the orientation of second representation 920 (e.g., flat on surface 916). In addition, or in the alternative, the modification of first representation 910 may include animating the UI elements such that the protruding 3D UI elements of first representation 910 are presented as receding into the flat 2D UI elements of second representation 920. In embodiments, the animation may also include a sound that may be played while the animation is occurring.

Figure 10A:
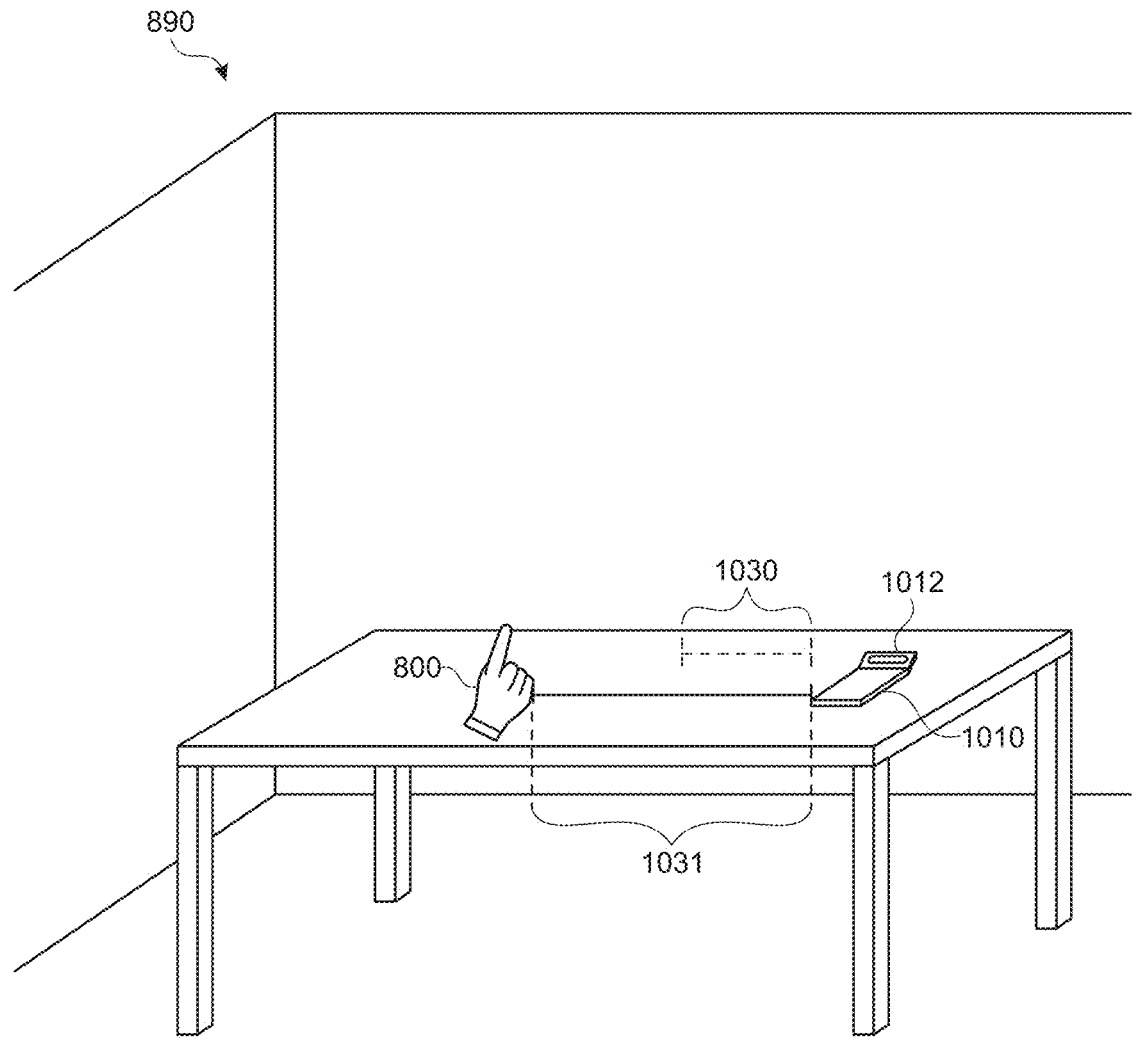
FIGS. 10A-10B depict yet another example of techniques for controlling a representation of a virtual object within a CGR environment based on characteristics of an input mechanism in accordance with aspects of the present disclosure.
Figure 10B:
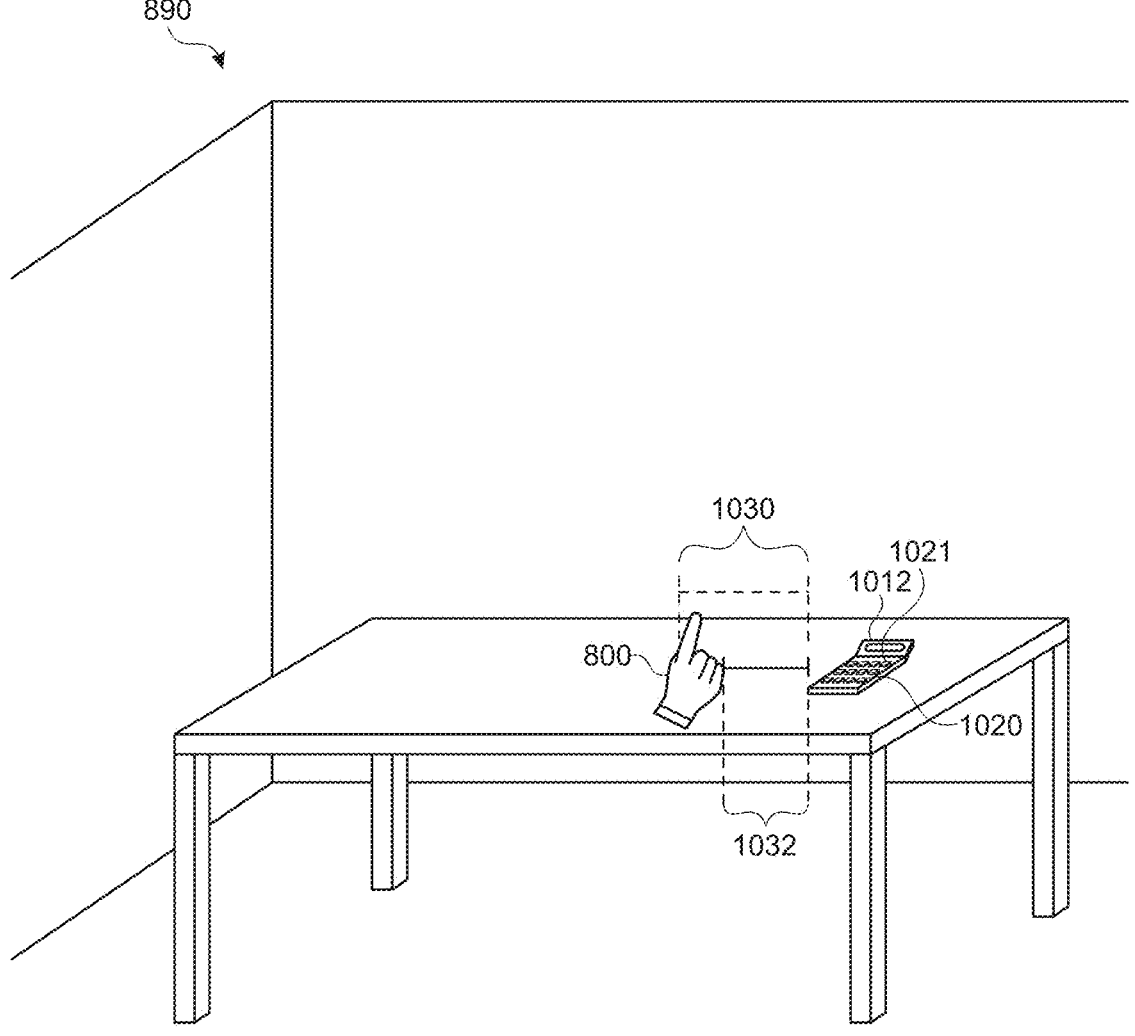

FIGS. 10A and 10B illustrate another example of techniques for controlling a representation of a virtual object within a CGR environment based on characteristics of an input mechanism in accordance with aspects of the present disclosure. In particular, FIGS. 10A and 10B illustrate an example in which a representation of a virtual object is modified based on characteristics of an input mechanism, and in which the modification includes adding UI elements for user interaction and changing the size of the representation.

As shown in FIG. 10A, first representation 1010 of a virtual object may be displayed via a display of electronic device 200. In embodiments, first representation 1010 may be a 3D representation of the virtual object, and the virtual object may be associated with a particular application (e.g., calendar, multimedia application, presentation, etc.), as discussed above. In the example illustrated in FIG. 10A, first representation 1010 may be associated with a calculator application.

In embodiments, first representation 1010 may be configured to facilitate non-direct interaction with the associated virtual object. For example, first representation 910 may include UI elements 1012. UI element 1012 may represent at least one UI element configured to provide (e.g., output) information associated with the virtual object represented by first representation 1010. For example, UI element 1012 may be a display (e.g., a virtual display) of first representation 1010. In some embodiments, first representation 1010 may have a size. In some embodiments, first representation 1010 may not include any UI elements configured for user input (e.g., a button, an affordance, a user-interface element, an interactive element, etc.).

As shown in FIG. 10A, and as discussed above, first representation 1010 may be displayed within CGR environment 890, and first representation 1010 may be configured to facilitate non-direct interaction by a user rather than direct interaction. As also shown in FIG. 10A, input mechanism 800 may be at a current location that is distance 1031 from first representation 1010. In some embodiments, predetermined distance 1030 from first representation 1010 may be provided.

In embodiments, in accordance with a determination that the current location of input mechanism 800 is not within predetermined distance 1030 from first representation 1010, the displaying of first representation 1010 may be maintained. For example, first representation 1010 configured for non-direct interaction may continue to be displayed without displaying another representation of the virtual object and/or without making changes to first representation 1010. Conversely, as will be discussed below, in accordance with a determination that the current location of input mechanism 800 is within predetermined distance 1030 from first representation 1010, the displaying of first representation 1010 may be modified and a second representation of the virtual object may be displayed. In aspects, the second representation of the virtual object may be different than first representation 1010.

As shown in FIG. 10B, input mechanism 800 may be moved from a previous location (e.g., as illustrated in FIG. 9A) to a current location with a distance 1030 to first representation 1010. The movement from the previous location to the current location may be detected (e.g., using input sensors as described above). In response to detecting the movement of input mechanism 800 from the previous location to the current location, a determination may be made as to whether the current location of input mechanism 800 to first representation 1010 may be within predetermined distance 1030 or not. In accordance with a determination that the current location of input mechanism 800 is within predetermined distance 1030 from first representation 1010, the displaying of first representation 1010 may be modified. In embodiments, modifying the displaying of first representation 1010 may include ceasing to display first representation 1010 and displaying second representation 1020, where second representation 1020 may be different from first representation 1010. In some embodiments, second representation 1020 may be displayed at the same location and/or on the same surface where first representation 1020 was displayed.

In embodiments, second representation 1020 may be configured to facilitate direct interaction by the user (e.g., user 202) with the associated virtual object. For example, whereas first representation 1010 may not include UI elements 911 configured for user input, second representation 1020 may include UI element 1021 configured for user interaction, as previously described. For example, UI element 1021 may include at least one UI element displayed as flat 2D UI elements.

In addition, second representation 1020 may be displayed having a size that is different than the size of first representation 1010. For example, second representation 1020 may be displayed with a size larger than the size of first representation 1010. In some embodiments, second representation 1020 may be displayed with a size smaller than the size of first representation 1010.

As previously described, in some embodiments, modifying first representation 1010, which may include displaying second representation 1020 may include animating the modification. For example, the modification of first representation 1010 may include animating a change in size of first representation 1010 such that first representation 1010 is displayed as growing or shrinking, as appropriate, from the current size to the size of second representation 1020. In addition, or in the alternative, the modification of first representation 1010 may include animating the UI elements such that the protruding 3D UI elements of first representation 910 are presented as receding into the flat 2D UI elements of second representation 920. In embodiments, the animation may also include a sound that may be played while the animation is occurring.

Figure 11A:
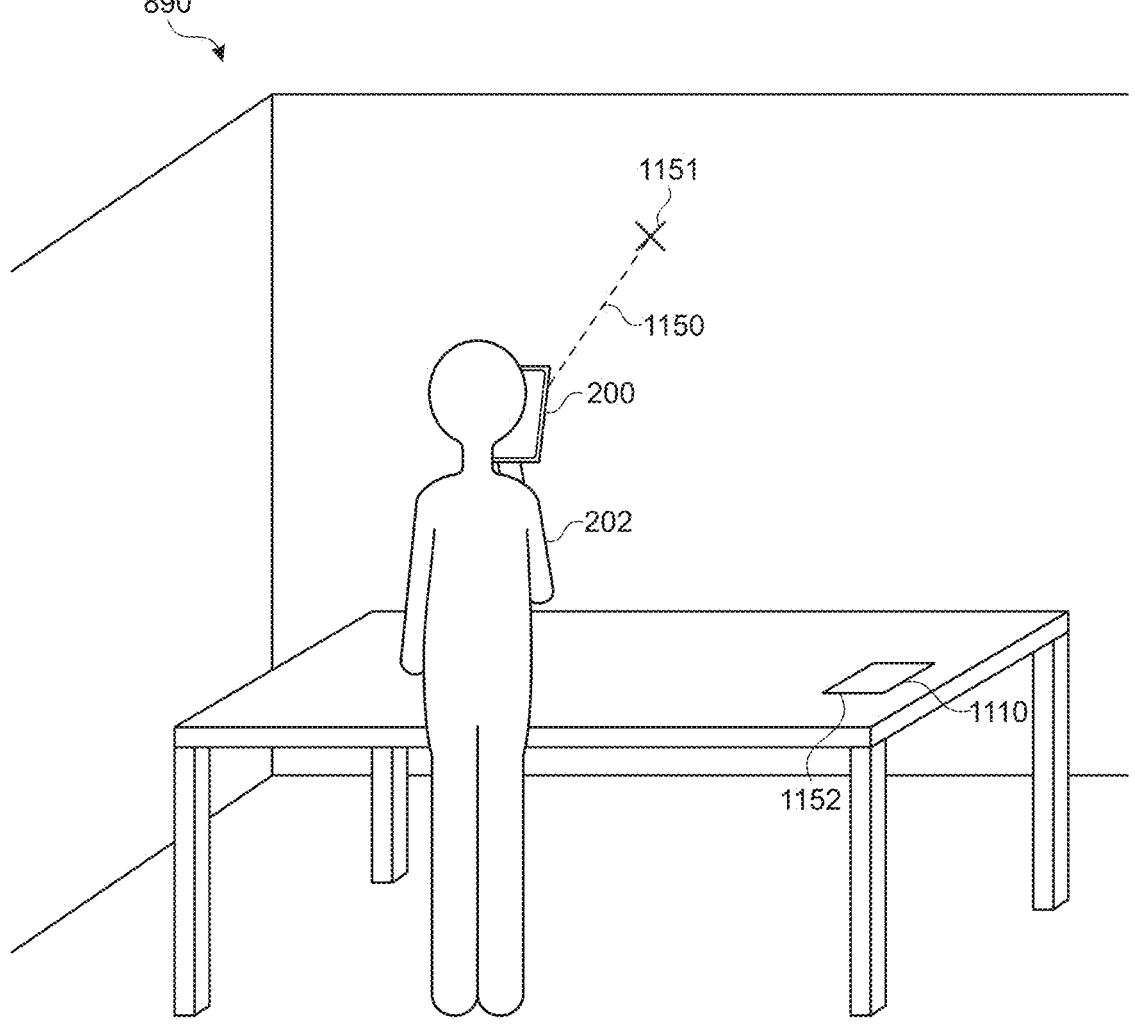
FIGS. 11A-11B depict still another example of techniques for controlling a representation of a virtual object within a CGR environment based on characteristics of an input mechanism in accordance with aspects of the present disclosure.
Figure 11B:
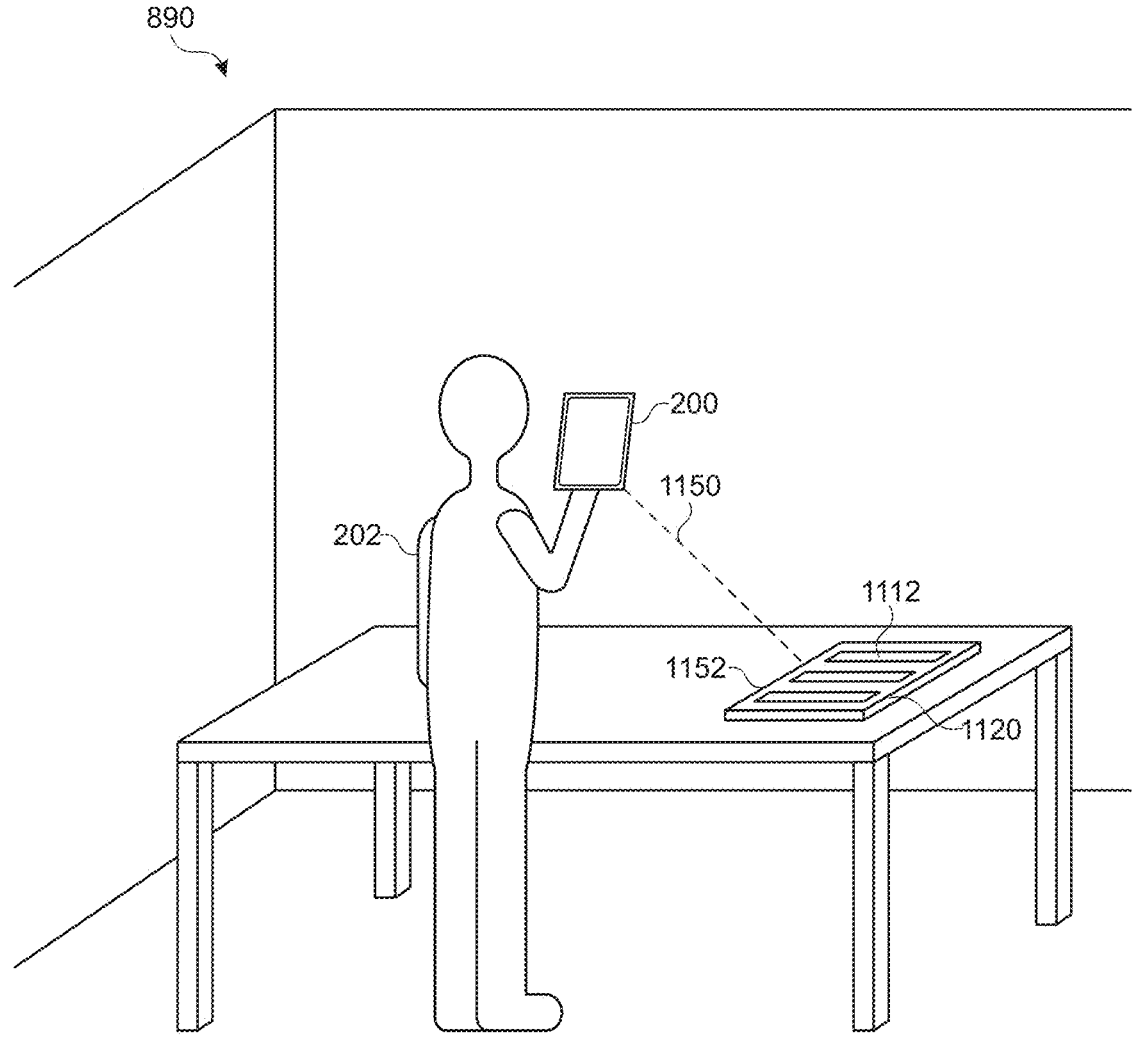

FIGS. 11A and 11B illustrate another example of techniques for controlling a representation of a virtual object within a CGR environment based on characteristics of an input mechanism in accordance with aspects of the present disclosure. In particular, FIGS. 11A and 11B illustrate an example in which a representation of a virtual object is modified based on characteristics of an input mechanism (e.g., a user's gaze).

As shown in FIG. 11A, first representation 1110 of a virtual object may be displayed via a display of electronic device 200. In embodiments, first representation 1110 may be a representation of the virtual object, and the virtual object may be associated with a particular application (e.g., calendar, multimedia application, presentation, etc.) as discussed above. In the example illustrated in FIG. 11A, first representation 1110 may be associated with a calendar application.

In embodiments, first representation 1110 may have a size and may be displayed at location 1152. In embodiments, first representation 1110 may not be configured for user interaction, whether direct or non-direct interaction. For example, the size of first representation 1110 may be a small size, and the small size may not enable a user to perceive any information from or interact with any UI elements of first representation 1110. In some embodiments, first representation 1110 may not include any UI elements.

As shown in FIG. 11A, a gaze 1150 of user 202, wearing electronic device 200, may be detected. In aspects, detected gaze 1150 can be a head gaze (e.g., the direction in which the user's head is facing), an eye gaze (e.g., the direction in which the user's eyes are looking), a combination thereof, etc. Gaze 1150 of user 202 may be determined to be focused, placed, or otherwise directed to location 1151, which may be different from location 1152 where first representation 1110 is displayed. In aspects, in accordance with the determination that gaze 1150 is directed to a location that is different than the location of first representation 1110, the displaying of first representation 1110, at the current location and having the size, may be maintained without displaying another representation of the virtual object and/or without making any changes to first representation 1110.

FIG. 11B shows that gaze 1150 of user 202 has changed to a different direction than the direction directed to location 1151. In embodiments, the change in gaze may be detected (e.g., via input sensors). In response to the detected change in the user's gaze, a determination of the direction of the new direction of the gaze may be made. For example, it may be determined that the new direction of gaze 1150 may be directed to location 1152. Location 1152 may be the location at which first representation 1110 is being displayed. In embodiments, in accordance with a determination that gaze 1150 is directed to a location that is the same as the location of first representation 1110, the displaying of first representation 1110 may be modified.

In some embodiments, determining to modify the displaying of first representation 1110 in accordance with a determination that gaze 1150 is directed to a location that is the same as the location of first representation 1110 may include a determination that the gaze 1150 has remained directed to the location that is the same as the location of first representation 1110 for at least a predetermined period of time. When it is determined that gaze 1150 has remained directed to the location that is the same as the location of first representation 1110 for a period of time that is less than the predetermined period of time (e.g., the direction of gaze 1150 is moved to a different direction before the predetermined period of time expires), the displaying of first representation 1110 may not be modified, but instead may be maintained without displaying another representation of the virtual object and/or without making any changes to first representation 1110. When it is determined that gaze 1150 has remained directed to the location that is the same as the location of first representation 1110 for a period of time that is at least the same as the predetermined period of time (e.g., the direction of gaze 1150 does not move to a different direction before the predetermined period of time expires), the displaying of first representation 1110 may be modified.

In embodiments, modifying the displaying of first representation 1110 may include ceasing to display first representation 1110 and displaying second representation 1120, where second representation 1120 may be different from first representation 1110. In some embodiments, second representation 1120 may be displayed at the same location and/or on the same surface where first representation 1120 was displayed.

In embodiments, second representation 1120 may be different from first representation 1110, and second representation 1120 may be configured to facilitate interaction by the user (e.g., user 202). For example, second representation 1120 may be configured to include UI elements 1112. UI elements 1112 may include at least one UI element configured for user interaction, such as a display. In some embodiments, second representation 1120 may alternatively or additionally have a size different than the size of first representation 1110. For example, second representation 1120 may have a size that is larger or smaller than the size of first representation 1110. In embodiments, the size of second representation 1120 may be based on a distance between the location of second representation 1120 (e.g., location 1152) and the location of the user's head and/or eyes (e.g., location 1153).

In some embodiments, second representation 1120 may be configured for non-direct interaction, but may not be configured for direct-interaction. For example, second representation 1120 may not include any UI elements configured for direct interaction with a user (e.g., a button, an affordance, a user-interface element, an interactive element, etc.). In this case, the techniques described above with respect to FIGS. 8A, 8B, 9A, 9B, 10A, and 10B may be used to selectively modify second representation 1120 into a configuration for direct interaction based on a characteristic of an input mechanism (e.g., a representation of an appendage, a mouse, a stylus, etc.) in accordance with the disclosure herein. In this manner, a representation of a virtual object may be selectively and dynamically modified from a non-interaction configuration to a non-direct interaction configuration based on a characteristic of an input mechanism (e.g., a user's gaze), and then may be further modified from the non-direct interaction configuration to a direct interaction configuration based on another characteristic of the input mechanism or based on a characteristic of another input mechanism (e.g., a representation of an appendage, input device, etc.).

Figure 12A:
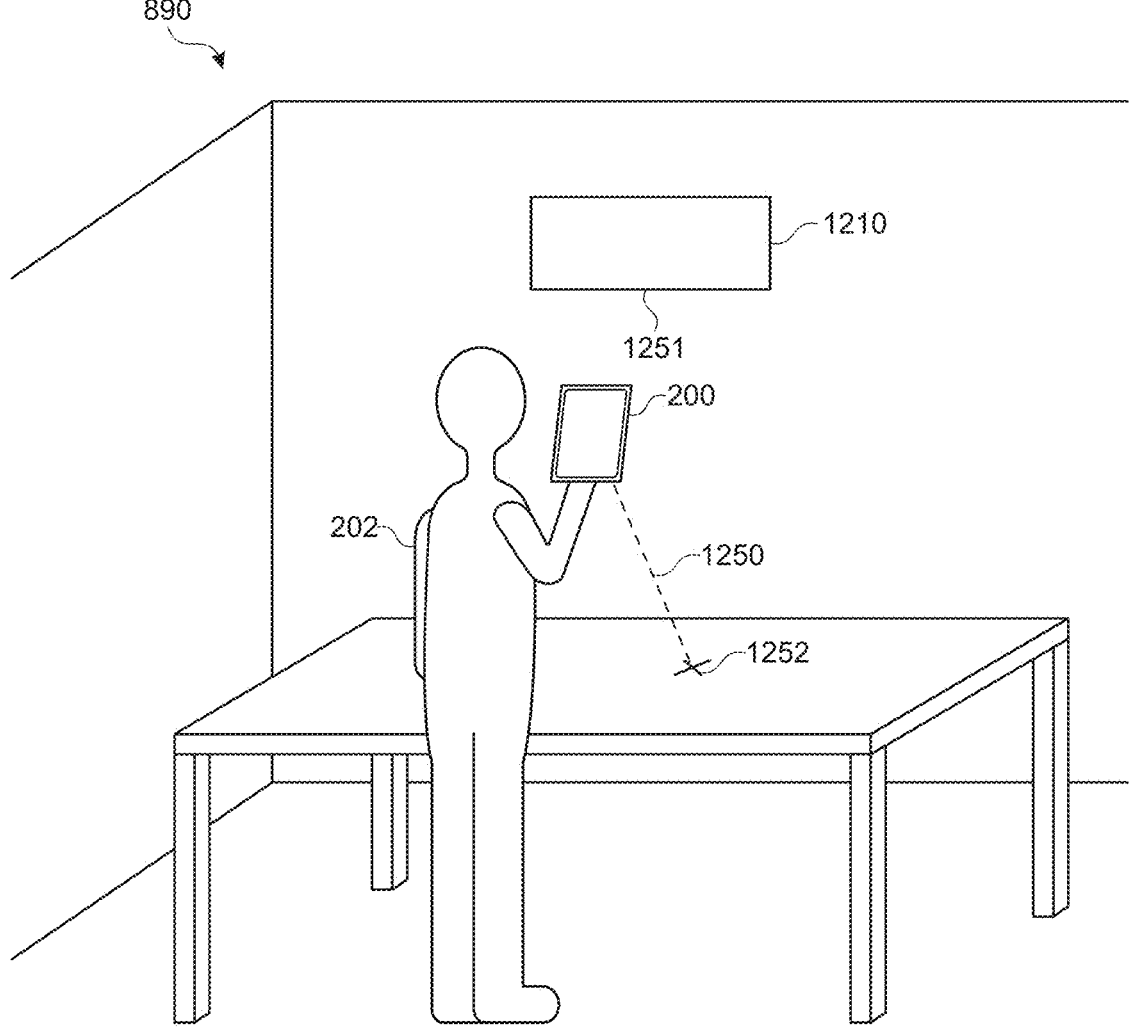
FIGS. 12A-12B depict another example of techniques for controlling a representation of a virtual object within a CGR environment based on characteristics of an input mechanism in accordance with aspects of the present disclosure.
Figure 12B:
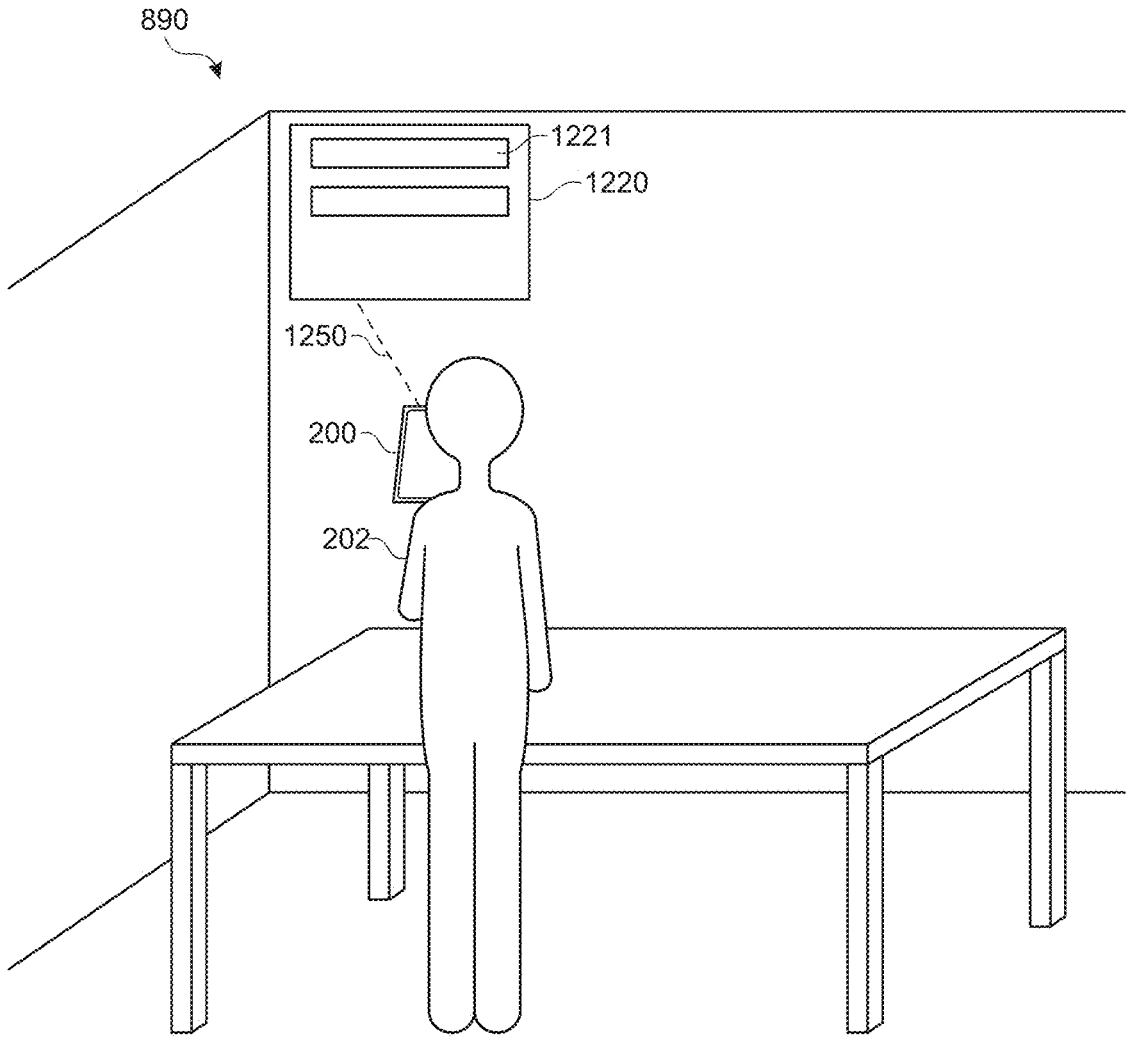

FIGS. 12A and 12B illustrate another example in which a representation of a virtual object within a CGR environment is modified based on a user's gaze. In particular, FIG. 12A shows user 202 wearing electronic device 200 configured to allow user 202 to view CGR environment 890. As shown in FIG. 12A, first representation 1210 of a virtual object may be displayed via a display of electronic device 200 at location 1251 and with a particular size. In aspects, location 1251 may be on a wall of CGR environment 890. In embodiments, first representation 1210 may be a representation of the virtual object, and the virtual object may be associated with a particular application (e.g., calendar, multimedia application, presentation, etc.) as discussed above. In the example illustrated in FIG. 12A, first representation 1210 may be associated with a calendar application. In embodiments, first representation 1210 may not be configured for user interaction, whether direct or non-direct interaction. For example, the size of first representation 1210 may be a small size, and the small size may not enable a user to perceive any information from or interact with any UI elements of first representation 1210.

As shown in FIG. 12A, a gaze 1250 of user 202 may be determined to be directed to location 1252, which may be different from location 1251 where first representation 1210 is displayed. In aspects, in accordance with the determination that gaze 1250 is directed to a location that is different than the location of first representation 1210, the displaying of first representation 1210 may be maintained without displaying another representation of the virtual object and/or without making any changes to first representation 1210.

FIG. 12B shows that gaze 1250 of user 202 has changed to a different direction than the direction directed to location 1252. In embodiments, the change in gaze may be detected (e.g., via input sensors). In response to the detected change in the user's gaze, a determination of the direction of the new direction of the gaze may be made. For example, it may be determined that the new direction of gaze 1250 may be directed to location 1251. Location 1251 is the location at which first representation 1210 is being displayed. In embodiments, in accordance with a determination that gaze 1250 is directed to a location that is the same as the location of first representation 1210, the displaying of first representation 1210 may be modified. For example, first representation 1210 may cease to be displayed, and second representation 1220 may be displayed, where second representation 1220 may be different from first representation 1210. In some embodiments, second representation 1220 may be displayed at the same location and/or on the same surface where first representation 1210 was displayed.

In embodiments, second representation 1220 may be configured to include UI elements 1221. UI elements 1221 may include at least one UI element configured for user interaction, such as a display. In some embodiments, second representation 1220 may alternatively or additionally have a size different than the size of first representation 1210. For example, second representation 1220 may have a size that is larger or smaller than the size of first representation 1210. In embodiments, the size of second representation 1220 may be based on a distance between the location of second representation 1220 (e.g., location 1251) and the location of the user's head and/or eyes. In some embodiments, second representation 1120 may be configured for non-direct interaction, but may not be configured for direct-interaction. For example, second representation 1120 may not include any UI elements configured for direct interaction with a user (e.g., a button, an affordance, a user-interface element, an interactive element, etc.).

In some embodiments, determining to modify the displaying of first representation 1210 in accordance with a determination that gaze 1250 is directed to a location that is the same as the location of first representation 1210 may include a determination that the gaze 1250 has remained directed to the location that is the same as the location of first representation 1210 for at least a predetermined period of time, as described with reference to FIGS. 11A and 11B.

As previously described, in embodiments, modifying the first representation, which may include displaying the second representation may include animating the modification. For example, the modification of the first representation may include animating a change in size of the first representation such that the first representation is displayed as growing or shrinking, as appropriate, from the current size to the size of the second representation. In addition, or in the alternative, the modification of the first representation may include animating the UI elements of the first representation such that the UI elements are presented as receding into the first representation. In embodiments, the animation may also include a sound that may be played while the animation is occurring.

It is noted that, in embodiments, the implementations of the techniques described herein may include any combination of the features and functionalities described above. For example, a representation of a virtual object may be modified to have any one of, and/or any combination of, a different size, different UI elements, different types of UI elements (e.g., flat UI elements, protruding UI elements, etc.), a different orientation, a different location, a different shape, a different brightness, etc.

FIG. 13 is a flow diagram illustrating method 1300 for controlling a representation of a virtual object within a CGR environment based on characteristics of an input mechanism. In some embodiments, method 1300 may be performed by system 100 or a portion of system 100. In some embodiments, method 1300 may be performed by one or more external systems and/or devices. In some embodiments, method 1300 may be performed by system 100 (or a portion of system 100) in conjunction with one or more external systems and/or devices.

At block 1302, the system displays, via a display of an electronic device (e.g., a wearable electronic device, an HMD device, etc.), a first representation of a virtual object within a CGR environment. For example, a first representation of a virtual object may be displayed via a first display (e.g., a left eye display panel) or second display (e.g., a second eye display panel) of an electronic device on a representation of a display within the CGR environment. In embodiments, the first representation of the virtual object may be a virtual representation (e.g., a virtual representation superimposed over a first surface of the CGR environment via a translucent display of the electronic device).

In embodiments, the first representation of the virtual object may be configured to facilitate non-direct interaction with the virtual object. For example, the first representation of the virtual object may include at least one UI element of UI elements configured for non-direct interaction such that a user may perceive an interact with the UI elements without directly manipulating the UI elements (e.g., a UI element configured for output).

In embodiments, the first representation of the virtual object may include at least one UI element of UI elements that may be configurable to facilitate non-direct interaction, but are not configured for direct interaction (e.g., the UI elements may be displayed as protruding 3D UI elements). For example, the UI elements may include a button, an affordance, a user-interface element, an interactive element, etc., and/or any combination thereof. When the UI elements are configured to facilitate direct interaction, a user may select, click, select, and/or otherwise manipulate the UI elements.

In embodiments, a movement of an input mechanism may be detected. The input mechanism may include a mechanism configured to facilitate interaction with the virtual object. For example, the input mechanism may include a mechanism for a user to manipulate at least one element of the representation of the virtual object, or to perceive data provided by the virtual object. In embodiments, the input mechanism may include a representation of an appendage of the user (e.g., a finger, hand, leg, foot, etc.), a user's gaze (e.g., head gaze, eye gaze, etc.), an input device (e.g., a mouse, a stylus, etc.), etc. In embodiments, the representation of an appendage of the user may include a virtual representation of the appendage and/or may include data representing characteristics of the appendage (e.g., location, orientation, distance to a particular point, etc.) within the CGR environment. In aspects, using input sensors (e.g., touch-sensitive surfaces, image-sensors, etc.) configured to perform hand-tracking, head gaze-tracking, eye gaze-tracking, finger-tracking, etc., a movement of the input mechanism may be detected. For example, the input mechanism may move from a previous location to a current location.

In embodiments, in response to the detected movement of the input mechanism, a determination may be made as to whether the current location of the input mechanism is within the predetermined distance from the first representation or not. However, when no movement of the input mechanism is detected, the determination of whether the current location of the input mechanism is within the pre-determined distance from the first representation or not may not be performed. In some embodiments, the determination of whether the current location of the input mechanism is within the predetermined distance from the first representation or not may be performed when a detected movement is determined to be towards the first representation. In these cases, if the movement of the input mechanism is determined to be away from the first representation, the determination of whether the current location of the input mechanism is within the predetermined distance from the first representation or not may not be performed even though a movement of the input mechanism may be detected.

At block 1304, in accordance with a determination that the current location of the input mechanism is within a predetermined distance from the first representation of the virtual object, the system displays, via the display of the electronic device, a second representation of the virtual object within the CGR environment. In embodiments, the second representation of the virtual object may be different from the first representation of the virtual object.

In embodiments, in response to displaying the second representation of the virtual object, the first representation may cease to be displayed. In some embodiments, the second representation may be displayed at the same location and/or on the same surface where the first representation was displayed.

In embodiments, the second representation may be configured to facilitate direct interaction by a user with the associated virtual object. For example, the second representation may include at least one UI element of UI elements configured for direct interaction. In embodiments, the UI elements may include at least one UI element displayed as a flat 2D UI element displayed upon a physical object. In embodiments, the UI elements may include any one of and/or any combination of a button, an affordance, a user-interface element, an interactive element, etc.

In some embodiments, the second representation may have a size that is different than the size of the first representation. For example, the size of the second representation may be greater than the size of the first representation. In embodiments, the second representation may include a portion of the first representation, and the portion of the first representation included in the second representation may be larger than the size of the same portion in the first representation.

In some embodiments, the second representation of the virtual object may be displayed at a location that is different than the current location of the first representation. In embodiments, the location at which the second representation of the virtual object may be displayed may be a location that is closer to the user than the current location of the first representation. In some embodiments, the second representation displayed at the new location may be the same representation as the first representation.

In some embodiments, the first representation may be a 3D representation of the virtual object, and the second representation may be a 2D representation of the virtual object. In embodiments, the second representation may include at least a portion of the virtual object that is not displayed in the first representation of the virtual object.

As described above, one aspect of the present technology is the gathering and use of data available from various sources to provide specialized resource management of low-power devices with additive displays (e.g., HMD devices with additive displays) to conserve battery life for users and to provide specialized content to users of the low-power devices. The present disclosure contemplates that, in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to conserve battery life of a user's low-power device. Accordingly, for example, the use of such personal information data the system to properly manage resources to conserve battery life for the low-power devices. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of managing resources for low-powered devices, the present technology can be configured to allow users to select to "opt in" or "opt out" of participation in the collection of personal information data during registration for services or anytime thereafter. In another example, users can select not to provide eye tracking data, such as pupil location, pupil dilation, and/or blink rate for specialized resource management. In yet another example, users can select to limit the length of time the eye-tracking data is maintained or entirely prohibit the development of a baseline eye tracking profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, resources of low-powered devices can be managed and content (e.g., status updates and/or objects) can be selected and delivered to users by inferring preferences based on non-personal information data or a bare minimum amount of personal information, such as the content being requested by the device associated with a user, other non-personal information available to the system controlling the low-power device, or publicly available information.

What is claimed is:
1. A system, comprising:
a display;
one or more processors; and
memory storing one or more programs configured to be executed by the one or more processors, the one or more programs including instructions for:

displaying, via the display, a two-dimensional (2D) representation of a virtual object at a first location of a computer-generated reality (CGR) environment;

receiving a request to concurrently display a three-dimensional (3D) representation of the virtual object with the 2D representation;

in response to receiving the request, concurrently displaying, via the display, the 2D representation at the first location and the 3D representation at a second location of the CGR environment, wherein the second location is different from the first location;

in response to receiving a first request to modify the 2D representation:
modifying the 3D representation in accordance with a modification corresponding to the first request to modify the 2D representation; and in response to receiving a first request to modify the 3D representation:
modifying the 2D representation in accordance with a modification corresponding to the first request to modify the 3D representation.

2. The system of claim 1, wherein receiving the request to concurrently display includes receiving a request to drag the 2D representation of the virtual object from the first location to the second location of the CGR environment.

3. The system of claim 1, wherein the request to concurrently display includes a selection of an interactive element displayed with the 2D representation of the virtual object.

4. The system of claim 1, wherein concurrently displaying the 2D representation at the first location and the 3D representation at the second location of the CGR environment includes animating of the 3D representation as popping out the 2D representation.

5. The system of claim 1, the one or more programs further including instructions for:
in response to receiving a second request to modify the 2D representation:
forgo modifying the 3D representation in accordance with a modification corresponding to the second request to modify the 2D representation; and
in response to receiving a second request to modify the 3D representation:
forgo modifying the 2D representation in accordance with a modification corresponding to the second request to modify the 3D representation.

6. The system of claim 1, wherein the 2D representation of the virtual object includes at least one interactive user interface (UI) element.

7. The system of claim 6, wherein the at least one interactive UI element of the 2D representation is not included in the 3D representation of the virtual object.

8. A non-transitory computer-readable storage medium storing one or more programs configured to be executed by one or more processors of a system having a display, the one or more programs including instructions for:
displaying, via the display, a two-dimensional (2D) representation of a virtual object at a first location of a computer-generated reality (CGR) environment;

receiving a request to concurrently display a three-dimensional (3D) representation of the virtual object with the 2D representation;

in response to receiving the request, concurrently displaying, via the display, the 2D representation at the first location and the 3D representation at a second location of the CGR environment, wherein the second location is different from the first location;

in response to receiving a first request to modify the 2D representation:

modifying the 3D representation in accordance with a modification corresponding to the first request to modify the 2D representation; and in response to receiving a first request to modify the 3D representation:

modifying the 2D representation in accordance with a modification corresponding to the first request to modify the 3D representation.

9. A method, comprising:

displaying, via a display of a wearable electronic device, a two-dimensional (2D) representation of a virtual object at a first location of a computer-generated reality (CGR) environment;

receiving a request to concurrently display a three-dimensional (3D) representation of the virtual object with the 2D representation;

in response to receiving the request, concurrently displaying, via the display of the wearable electronic device, the 2D representation at the first location and the 3D representation at a second location of the CGR environment, wherein the second location is different from the first location;

in response to receiving a first request to modify the 2D representation:

modifying the 3D representation in accordance with a modification corresponding to the first request to modify the 2D representation; and in response to receiving a first request to modify the 3D representation:

modifying the 2D representation in accordance with a modification corresponding to the first request to modify the 3D representation.

10. The system of claim 1, wherein:

the 2D representation of the virtual object includes a set of one or more 2D interactive user interface (UI) elements;

the 3D representation includes a set of one or more 3D interactive UI elements that includes at least one 3D interactive UI element that performs a same function as at least one 2D interactive UI element of the set of one or more 2D interactive UI elements; and the set of one or more 2D interactive UI elements of the 2D representation and the set of one or more 3D interactive UI elements of the 3D representation include a different number of interactive UI elements.

11. The non-transitory computer-readable storage medium of claim 8, wherein receiving the request to concurrently display includes receiving a request to drag the 2D representation of the virtual object from the first location to the second location of the CGR environment.

12. The non-transitory computer-readable storage medium of claim 8, wherein the request to concurrently display includes a selection of an interactive element displayed with the 2D representation of the virtual object.

13. The non-transitory computer-readable storage medium of claim 8, wherein concurrently displaying the 2D representation at the first location and the 3D representation at the second location of the CGR environment includes animating of the 3D representation as popping out the 2D representation.

14. The non-transitory computer-readable storage medium of claim 8, the one or more programs further including instructions for:

in response to receiving a second request to modify the 2D representation:

forgo modifying the 3D representation in accordance with a modification corresponding to the second request to modify the 2D representation; and in response to receiving a second request to modify the 3D representation:

forgo modifying the 2D representation in accordance with a modification corresponding to the second request to modify the 3D representation.

15. The non-transitory computer-readable storage medium of claim 8, wherein the 2D representation of the virtual object includes at least one interactive user interface (UI) element.

16. The non-transitory computer-readable storage medium of claim 15, wherein the at least one interactive UI element of the 2D representation is not included in the 3D representation of the virtual object.

17. The non-transitory computer-readable storage medium of claim 8, wherein:

the 2D representation of the virtual object includes a set of one or more 2D interactive user interface (UI) elements;

the 3D representation includes a set of one or more 3D interactive UI elements that includes at least one 3D interactive UI element that performs a same function as at least one 2D interactive UI element of the set of one or more 2D interactive UI elements; and the set of one or more 2D interactive UI elements of the 2D representation and the set of one or more 3D interactive UI elements of the 3D representation include a different number of interactive UI elements.

18. The method of claim 9, wherein receiving the request to concurrently display includes receiving a request to drag the 2D representation of the virtual object from the first location to the second location of the CGR environment.

19. The method of claim 9, wherein the request to concurrently display includes a selection of an interactive element displayed with the 2D representation of the virtual object.

20. The method of claim 9, wherein concurrently displaying the 2D representation at the first location and the 3D representation at the second location of the CGR environment includes animating of the 3D representation as popping out the 2D representation.

21. The method of claim 9, further comprising:

in response to receiving a second request to modify the 2D representation:

forgo modifying the 3D representation in accordance with a modification corresponding to the second request to modify the 2D representation; and in response to receiving a second request to modify the 3D representation:

forgo modifying the 2D representation in accordance with a modification corresponding to the second request to modify the 3D representation.

22. The method of claim 9, wherein the 2D representation of the virtual object includes at least one interactive user interface (UI) element.

23. The method of claim 22, wherein the at least one interactive UI element of the 2D representation is not included in the 3D representation of the virtual object.

24. The method of claim 9, wherein:

the 2D representation of the virtual object includes a set of one or more 2D interactive user interface (UI) elements;

the 3D representation includes a set of one or more 3D interactive UI elements that includes at least one 3D interactive UI element that performs a same function as at least one 2D interactive UI element of the set of one or more 2D interactive UI elements; and the set of one or more 2D interactive UI elements of the 2D representation and the set of one or more 3D interactive UI elements of the 3D representation include a different number of interactive UI elements.

* * * * *